(12) United States Patent
Kim et al.

(10) Patent No.: US 11,064,555 B2
(45) Date of Patent: Jul. 13, 2021

(54) METHOD FOR TRANSMITTING RRC MESSAGE AND WIRELESS DEVICE

(71) Applicant: LG Electronics Inc., Seoul (KR)

(72) Inventors: Jaehyun Kim, Seoul (KR); Taehun Kim, Seoul (KR); Hyunjung Choe, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 16/348,257

(22) PCT Filed: Nov. 9, 2017

(86) PCT No.: PCT/KR2017/012372
§ 371 (c)(1),
(2) Date: May 8, 2019

(87) PCT Pub. No.: WO2018/088756
PCT Pub. Date: May 17, 2018

(65) Prior Publication Data
US 2019/0320485 A1    Oct. 17, 2019

Related U.S. Application Data

(60) Provisional application No. 62/537,379, filed on Jul. 26, 2017, provisional application No. 62/419,479, filed on Nov. 9, 2016.

(51) Int. Cl.
*H04W 4/80* (2018.01)
*H04W 76/18* (2018.01)
(Continued)

(52) U.S. Cl.
CPC ............ *H04W 76/25* (2018.02); *H04W 4/80* (2018.02); *H04W 76/18* (2018.02); *H04W 76/27* (2018.02); *H04W 76/30* (2018.02)

(58) Field of Classification Search
CPC ......... H04L 29/06163; H04L 29/06993; H04L 29/08009; H04W 4/70; H04W 4/80;
(Continued)

(56) References Cited

U.S. PATENT DOCUMENTS 8,625,506 B2 *   1/2014   Chin ..................... H04L 12/66
                                                                370/329
8,655,305 B2 *   2/2014   Tiwari ................. H04W 76/50
                                                                455/404.1
(Continued)

FOREIGN PATENT DOCUMENTS

WO     2014084596     6/2014
WO     2016021922     2/2016

OTHER PUBLICATIONS

LG Electronics Inc., "RRC Connection Control in NB-IoT," R2-154878, 3GPP TSG-RAN WG2 #91bis, Malmo, Sweden, Sep. 30, 2015, see pp. 1-3.

(Continued)

*Primary Examiner* — Alpus Hsu
(74) *Attorney, Agent, or Firm* — Dentons US LLP

(57) ABSTRACT

A disclosure of the present specification provides a method for transmitting a radio resource control (RRC) message by a wireless device. The method may comprise the steps of: acquiring, by an access stratum (AS) layer of a wireless device, at least one of the value and indication of an RRC establishment cause field from a non-access stratum (NAS) layer which requests transmission of an NAS signaling request message; transmitting, to a base station, an RRC connection request message including the at least one of the value and indication of the RRC establishment cause field; and when the at least one of the value and indication of the RRC establishment cause field is set to a value, which indicates that the NAS signaling request message includes user data, according to an optimization scheme through a (Continued)

control plane (CP), if a network is in an overload state, receiving an RRC connection rejection message or an RRC connection release request message from the base station.

11 Claims, 23 Drawing Sheets

(51) Int. Cl.
*H04W 76/25* (2018.01)
*H04W 76/27* (2018.01)
*H04W 76/30* (2018.01)

(58) Field of Classification Search
CPC ..... H04W 76/18; H04W 76/25; H04W 76/27; H04W 76/30; H04W 76/38; H04W 80/08; H04W 80/10
See application file for complete search history.

(56) References Cited

U.S. PATENT DOCUMENTS

| | | | | |
|---|---|---|---|---|
| 8,811,244 | B2* | 8/2014 | Lee | H04W 76/36 370/310 |
| 9,125,182 | B2* | 9/2015 | Chin | H04W 76/50 |
| 9,137,674 | B2* | 9/2015 | Yang | H04W 24/02 |
| 9,198,088 | B2* | 11/2015 | Ayleni | H04W 48/18 |
| 9,295,088 | B2* | 3/2016 | Lee | H04W 76/10 |
| 9,497,792 | B2* | 11/2016 | Chin | H04L 65/1073 |
| 9,532,278 | B2* | 12/2016 | Park | H04W 36/0055 |
| 9,532,400 | B2* | 12/2016 | Schmidt | H04W 76/14 |
| 9,538,353 | B2* | 1/2017 | Chin | H04W 76/27 |
| 9,775,011 | B2* | 9/2017 | Pinheiro | H04W 4/14 |
| 9,848,358 | B2* | 12/2017 | Somasundaram | H04W 36/0033 |
| 9,877,349 | B2* | 1/2018 | Kim | H04W 4/80 |
| 10,129,802 | B2* | 11/2018 | Pelletier | H04L 5/0048 |
| 10,178,678 | B2* | 1/2019 | Watfa | H04W 76/10 |
| 2009/0025060 | A1* | 1/2009 | Mukherjee | H04L 63/123 726/3 |
| 2011/0070862 | A1* | 3/2011 | Chen | H04W 76/50 455/404.1 |
| 2012/0289183 | A1* | 11/2012 | Tiwari | H04W 76/50 455/404.1 |
| 2015/0140998 | A1 | 5/2015 | Kim et al. | |
| 2015/0304937 | A1* | 10/2015 | Kim | H04W 80/10 370/230 |
| 2015/0373733 | A1* | 12/2015 | Bangolae | H04W 52/244 370/329 |
| 2017/0079081 | A1* | 3/2017 | Kim | H04W 76/14 |
| 2017/0353902 | A1* | 12/2017 | Chen | H04W 36/0055 |
| 2018/0027479 | A1* | 1/2018 | Ahmad | H04W 48/12 370/235 |

OTHER PUBLICATIONS

Qualcomm Incorporated, "Correct in NB-IoT PDCP Linked to Support of S1-U Data Transfer," R2-167743, 3GPP TSG-RAN WG2 Meeting #96, Reno, USA, Nov. 4, 2016, see pp. 9-14.

* cited by examiner

METHOD FOR TRANSMITTING RRC MESSAGE AND WIRELESS DEVICE

CROSS-REFERENCE TO RELATED APPLICATIONS

This application is the National Stage filing under 35 U.S.C. 371 of International Application No. PCT/KR2017/012372, filed on Nov. 9, 2017, which claims the benefit of U.S. Provisional Applications No. 62/419,479 filed on Nov. 9, 2016, and No. 62/537,379 filed on Jul. 26, 2017, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN |

TABLE 1-continued

| REFERENCE POINT | DESCRIPTION |
|---|---|
| | that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In recent years, research into communication between devices or between a device and a server, without human interaction, i.e., machine type communication (MTC), has been actively conducted.

MTC is also called Internet of things (IoT) communication because there is no human intervention. Performing IoT communication based on cellular rather than wireless LAN like Wi-Fi is called CIoT. Unlike wireless LAN, CIoT supports even communication not based on an IP, as well as IP-based communication.

Meanwhile, in order to support a CIoT service, the 3GPP has improved a physical layer, i.e., radio access technology (RAT). The improved RAT is called narrowband (NB)-IoT.

However, in the environment in which NB-IoT RAT is used, many devices perform data transmissions. In such a case, there is a problem that network overload and congested situation may occur.

Meanwhile, it is expected that a CIoT device using NB-IoT RAT transmits and receives a small amount of data, generally. However, in order for the CIoT device to transmit and receive data, the CIoT device needs to exchange a large number of signals with an eNB in advance. In order to transmit and receive a small amount of data as such, it may be inefficient to transmit and receive many control signals in advance. In order to solve such a problem, there is an attempt for optimization by using a Control Plane (CP) and an attempt for optimization by using a User Plane (UP) in an evolved packet service (EPS) for CIoT.

However, even in the case that a CIoT device transmits a small amount of data according to the optimization method, there is a problem that the transmission may be failed in network congested situation.

SUMMARY OF THE INVENTION

Accordingly, an object of the present invention is to present a method that can solve the aforementioned problem.

In an aspect, a disclosure of the present specification provides a method for transmitting a Radio Resource Control (RRC) message performed by a wireless device. The method may include obtaining, by an Access Stratum (AS) layer of the wireless device, one or more of a value of RRC establishment cause field or indication from a Non-Access Stratum (NAS) layer requesting a transmission of a NAS signaling request message; transmitting, to a base station, an RRC connection request message including one or more of the value of RRC establishment cause field or the indication; and when one or more of the value of RRC establishment cause field or the indication is set to a value indicating that the NAS signaling request message includes user data according to an optimization method through control plane (CP), if a network is in overload state, receiving an RRC connection reject message or an RRC connection release request message from the base station.

The method may further include forwarding, by the AS layer, information for a mode of radio access technology (RAT) of the base station to the NAS layer, the information for a mode indicates whether the RAT of the base station is in NB-S1 mode operating as an improved RAT for Narrowband (NB) IoT or WB-S1 mode operating as a normal RAT for NB IoT.

When the AS layer forwards the information indicating the NB-S1 mode to the NAS layer, only the value of RRC establishment cause field may be obtained from the NAS layer, and when the AS layer forwards the information indicating the WB-S1 mode to the NAS layer, wherein only the indication may be obtained from the NAS layer.

When the AS layer does not forward the information for a mode of the RAT of the base station to the NAS layer, only the indication may be obtained or only the value of RRC establishment cause field may be obtained from the NAS layer.

When only the indication is obtained from the NAS layer, the method may further include setting the value of RRC establishment cause field in the RRC connection request message based on the indication.

When only the value of RRC establishment cause field is obtained from the NAS layer, the method may further include setting the indication in the RRC connection request message based on the value of RRC establishment cause field.

The RRC connection reject message or the RRC connection release request message may include a value of extended back-off timer.

When an RRC connection setup message is received instead of the RRC connection reject message, the method may further include, by the AS layer, transmitting an RRC connection setup complete message including an indication that only the optimization method through control plane (CP) is supported.

In an aspect, a disclosure of the present specification provides a wireless device for transmitting a Radio Resource Control (RRC) message. The wireless device may include a transceiver; a processor for controlling the transceiver, including an Access Stratum (AS) layer and a Non-Access Stratum (NAS) layer, when the AS layer obtains one or more of a value of RRC establishment cause field or indication from the NAS layer requesting a transmission of a NAS signaling request message, the AS layer transmits an RRC connection request message including one or more of the value of RRC establishment cause field or the indication to a base station, when one or more of the value of RRC establishment cause field or the indication is set to a value indicating that the NAS signaling request message includes user data according to an optimization method through control plane (CP), if a network is in overload state, the AS layer receives an RRC connection reject message or an RRC connection release request message from the base station.

According to the present disclosure, the aforementioned problems of the related art may be solved.

DESCRIPTION OF EXEMPLARY EMBODIMENTS

Figure 1:
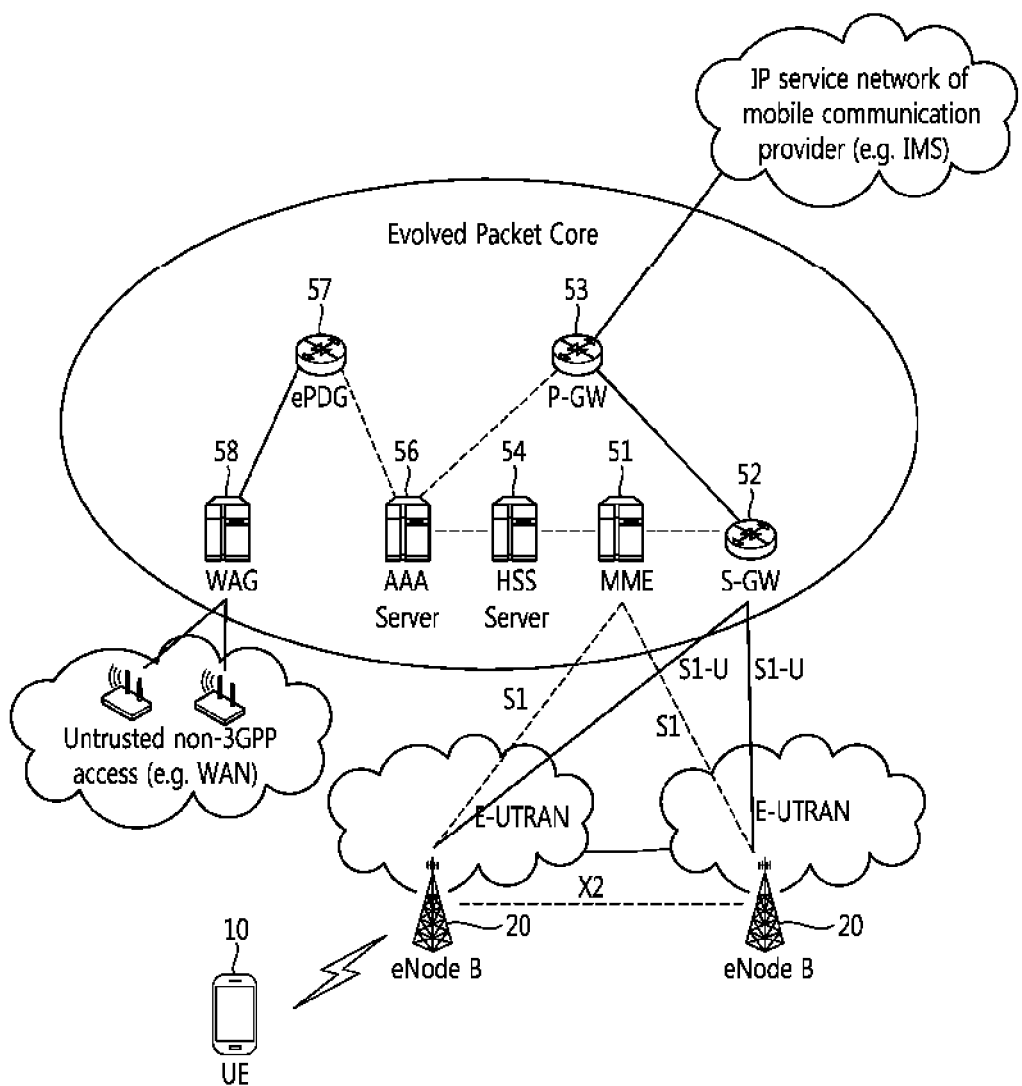
FIG. 1 is a structural diagram of an evolved mobile communication network.
Figure 2:
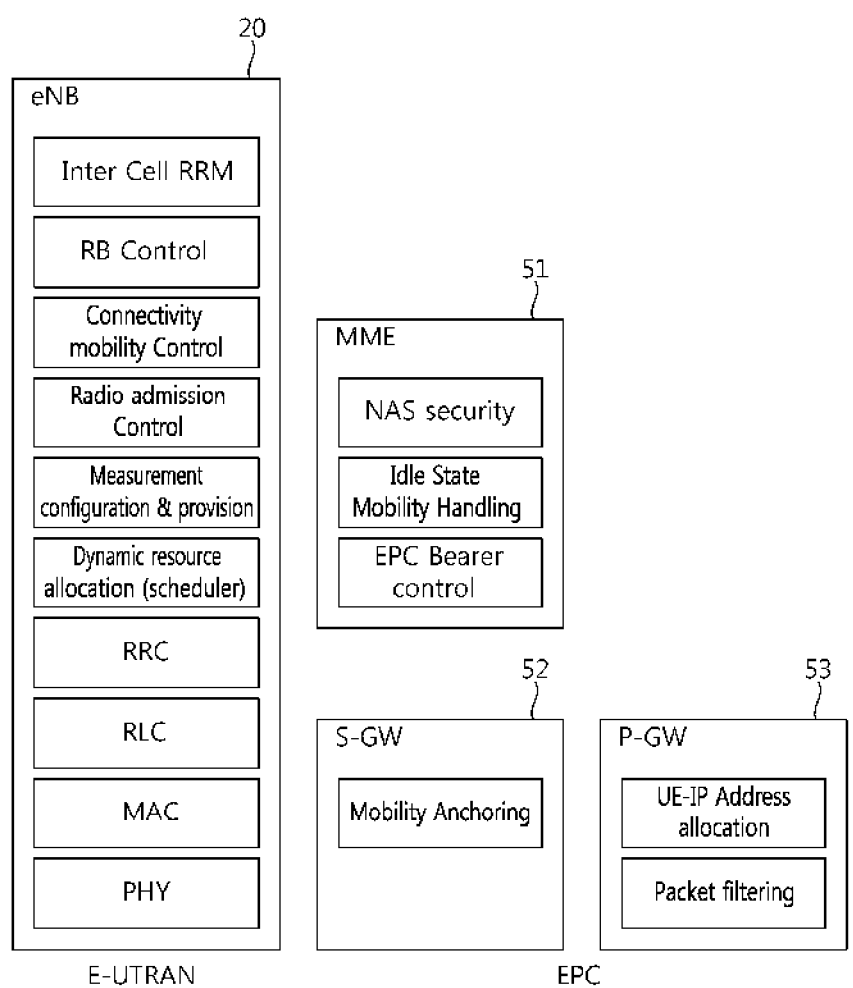
FIG. 2 is an exemplary diagram illustrating architectures of a general E-UTRAN and a general EPC.
Figure 3:
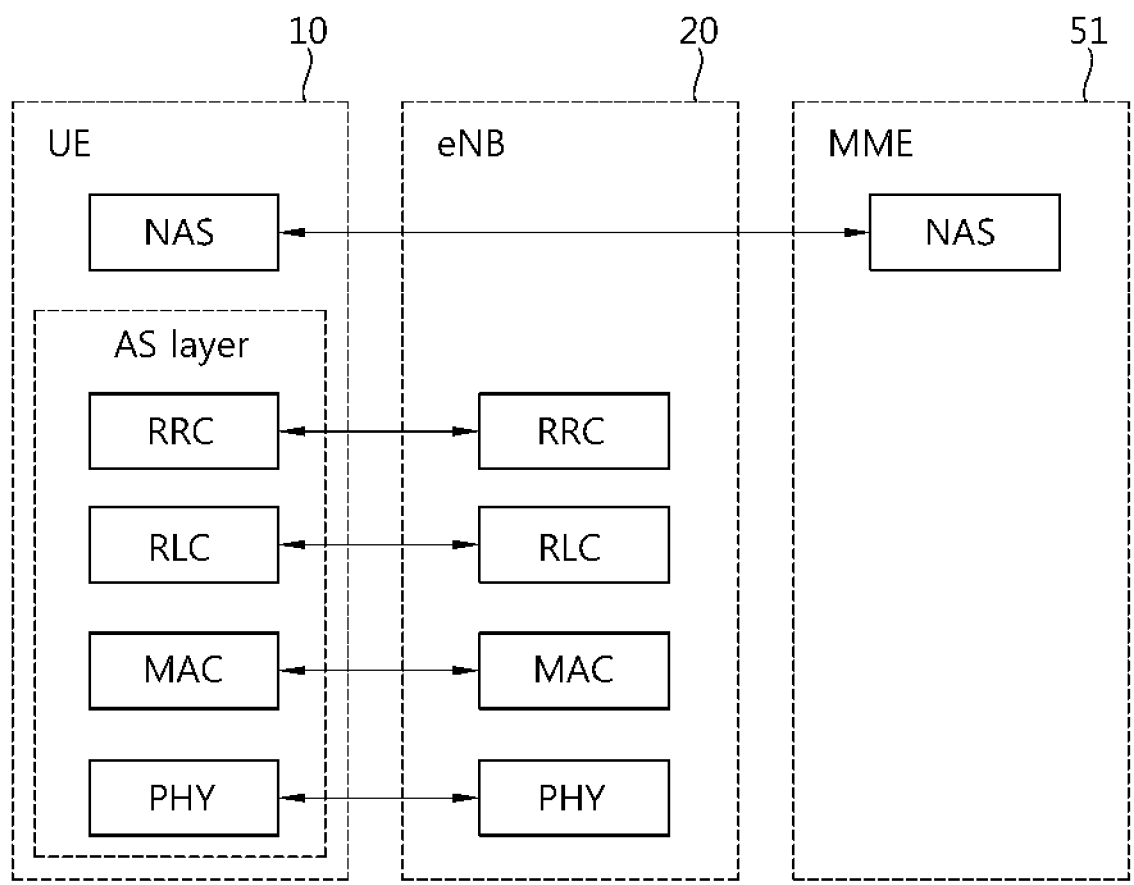
FIG. 3 is an exemplary diagram illustrating a structure of a radio interface protocol on a control plane between UE and eNodeB.
Figure 4:
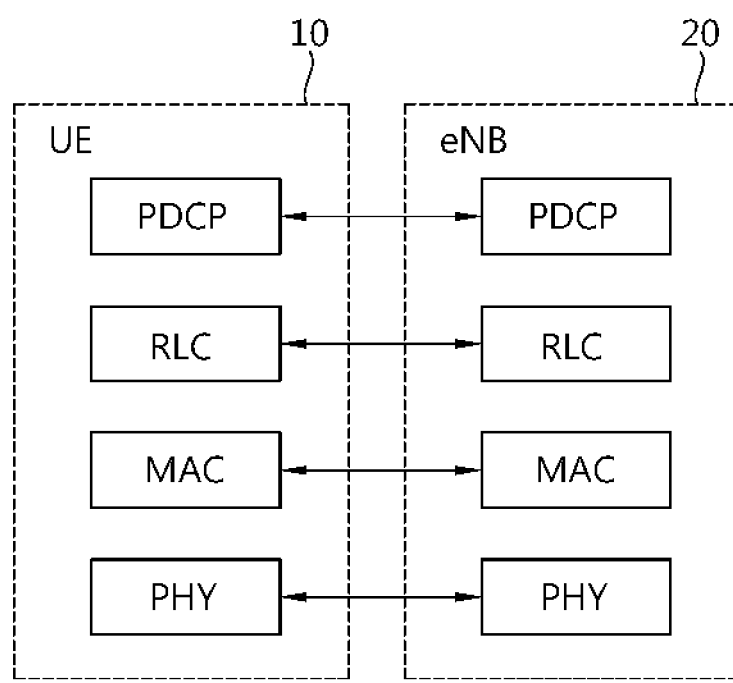
FIG. 4 is another exemplary diagram illustrating a structure of a radio interface protocol on a user plane between the UE and a base station.
Figure 5A:
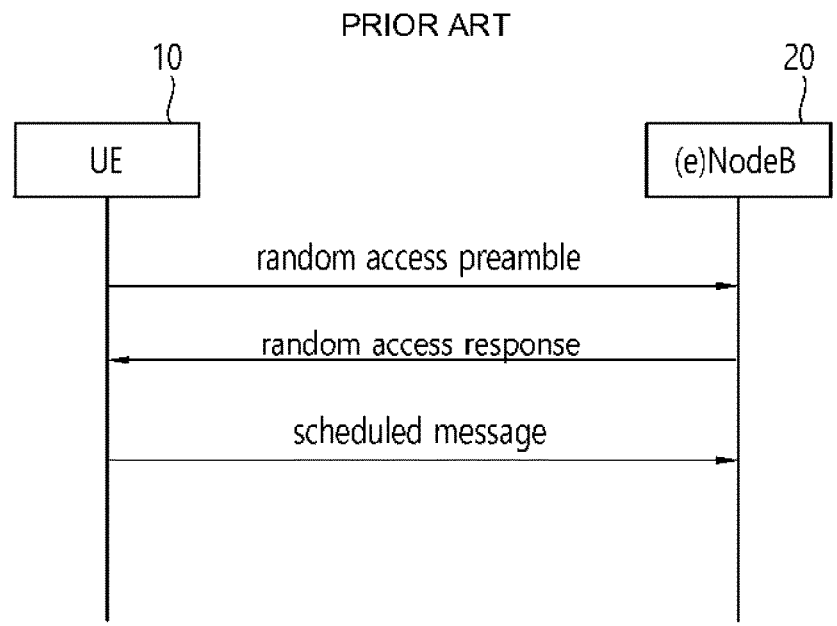
FIG. 5a is a flowchart illustrating a random access process in 3GPP LTE.
Figure 5B:
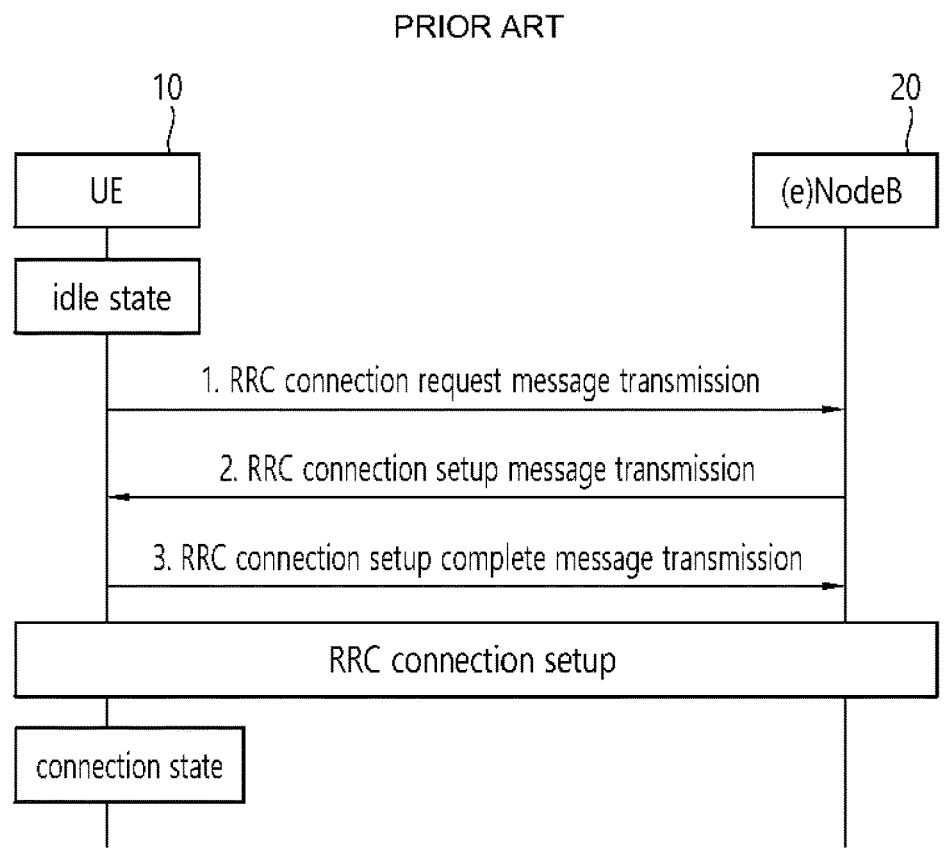
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classifed into a home PLMN (HPLMN) and a vistied PLMN (VPLMN).

CIoT: An abbreviation of Cellular Internet of Things, and means performing based on IoT communication.

Narrowband-IoT: It refers to radio access technology (RAT) improved in 3GPP for CIoT. That is, it is a network operating at a bandwidth of up to 180 kHz (corresponding to one PRB).

Control plane CIoT EPS optimization: A signaling optimization on a control plane that enables efficient transmission of user data (user data based on IP or non-IP or SMS)

User plane CIoT EPS optimization: A signaling optimization on a user plane that enables efficient transmission of user data (user data based on IP or non-IP or SMS)

UE supporting CIoT EPS optimization: A UE that supports Control plane CIoT EPS optimization or User plane CIoT EPS optimization and one or more other CIoT EPS optimizations NB-S1 mode: This means a mode operating as an improved RAT (radio access technology) for NB (Narrowband) IoT WB-S1 mode: This means a mode operating as a normal RAT, not an improved RAT for NB IoT Hereinafter, an aspect of the present specification is described with reference to the accompanying drawings.

Hereinafter, an aspect of the present specification is described with reference to the accompanying drawings.

Figure 6:
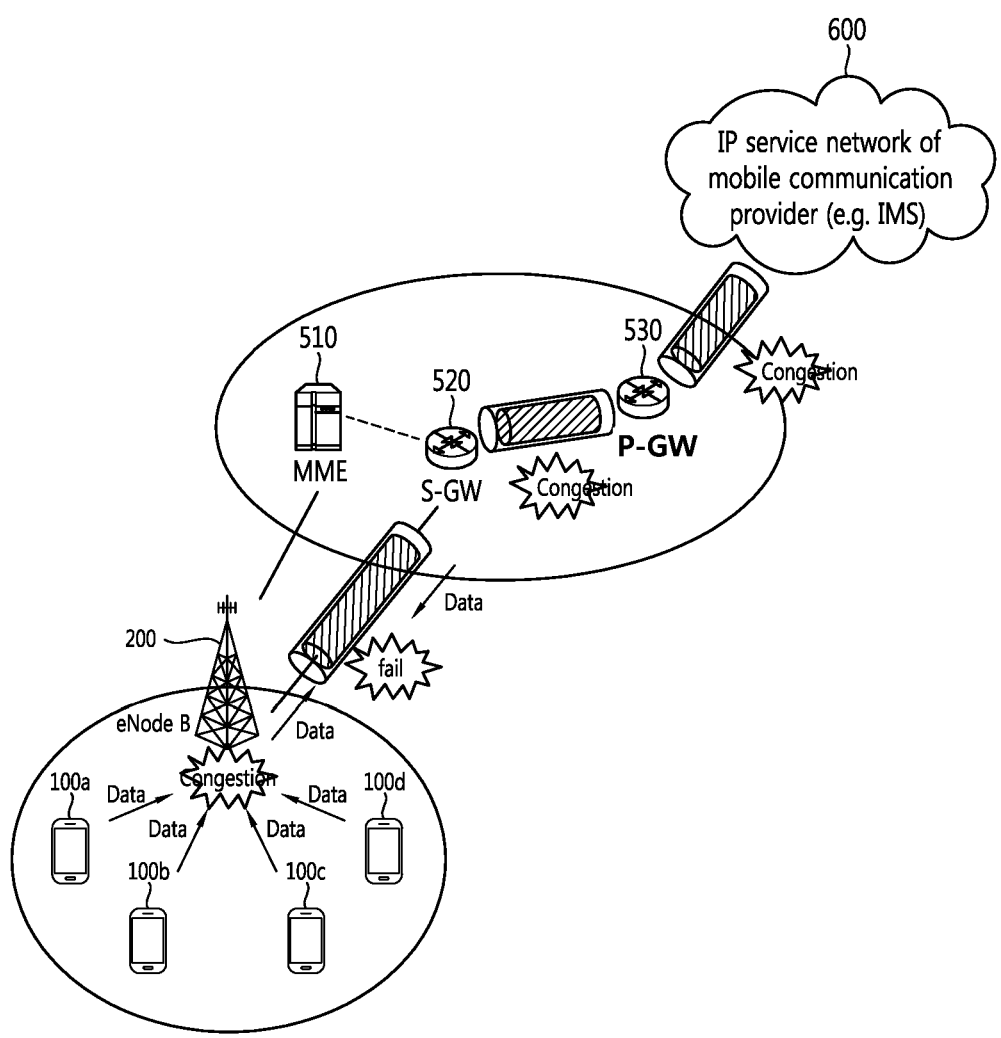
FIG. 6 shows a network overload state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended back-off timer. In this case, the RRC connection establishment request may not be re-attempted until the extended back-off timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
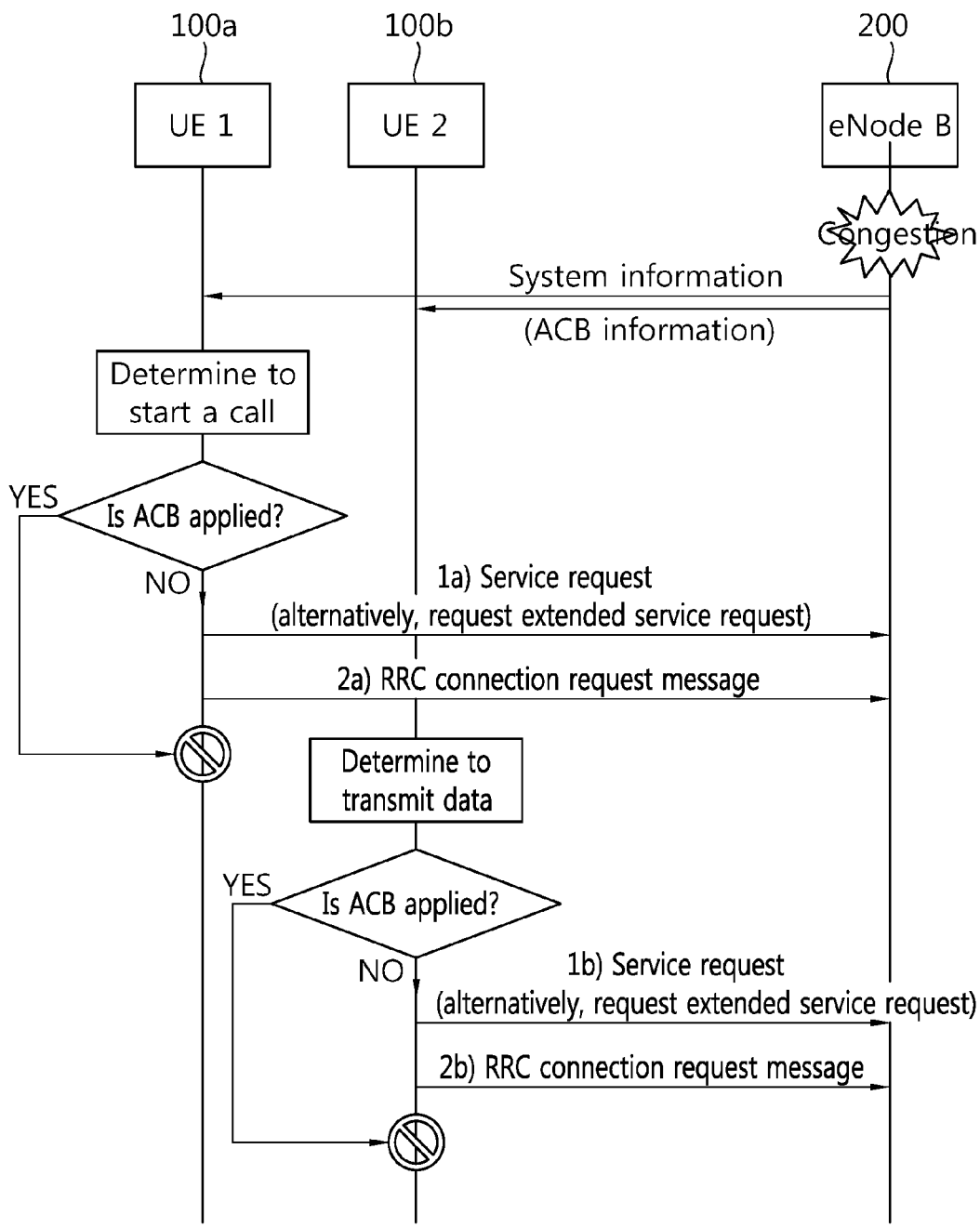
FIG. 7 is an exemplary flowchart illustrating an access barring operation in a network congested state.

FIG. 7 is an exemplary flowchart illustrating an access barring operation in a network congested state.

As illustrated in FIG. 7a, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
|---|---|
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100a determines an IMS service, for example, mobile orienting of a call by VoLTE and generates a service request message. Similarly, UE2 100b determines mobile orienting of general data and generate the service request message.

Sequentially, the UE1 100a generates an RRC connection request message. Similarly, the UE2 100b generate the RRC connection request message.

Meanwhile, the UE1 100a performs access barring check (that is, whether the ACB is applied). Similarly, the UE2 100b performs access barring check (that is, whether the ACB is applied).

If the ACB is not applied, the UE1 100a and the UE2 100b may transmit a service request (alternatively, an extended service request) message and the RRC connection request message, respectively. However, when the ACB is applied, both the UE1 100a and the UE2 100b may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100a and the UE2 100b. Then, the UE1 100a and the UE2 100b verify whether the access barring is applied, by using a barring factor included in the received ACB-related information, based on the stored access class. The access barring check is performed in each access stratum (AS) layer, that is, an RRC layer of the UE1 100a and the UE2 100b.

The access barring check will be described in more detail as follows.

The ac-BarringPerPLMN-List is included in the SIB type 2 received by each of the UE1 100a and the UE2 100b, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100a and the UE2 100b perform the RRC connection request, the access barring check is performed by using T303 as Tbarring and using ac-BarringForMO-Data as a barring parameter.

When the barring is determined, each AS(RRC) layer of the UE1 100a and the UE2 100b notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Marring timer is driven.

Meanwhile, while the T302 timer or a Marring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, an access barring check is performed with respect to a normal Mobile Originating (MO) service, for example, an originating call, an originating data, an originating IMS voice and an originating IMS video. That is, ACB is applied accesses of all application programs (however, except a response to an urgent service or paging).

Figure 8:
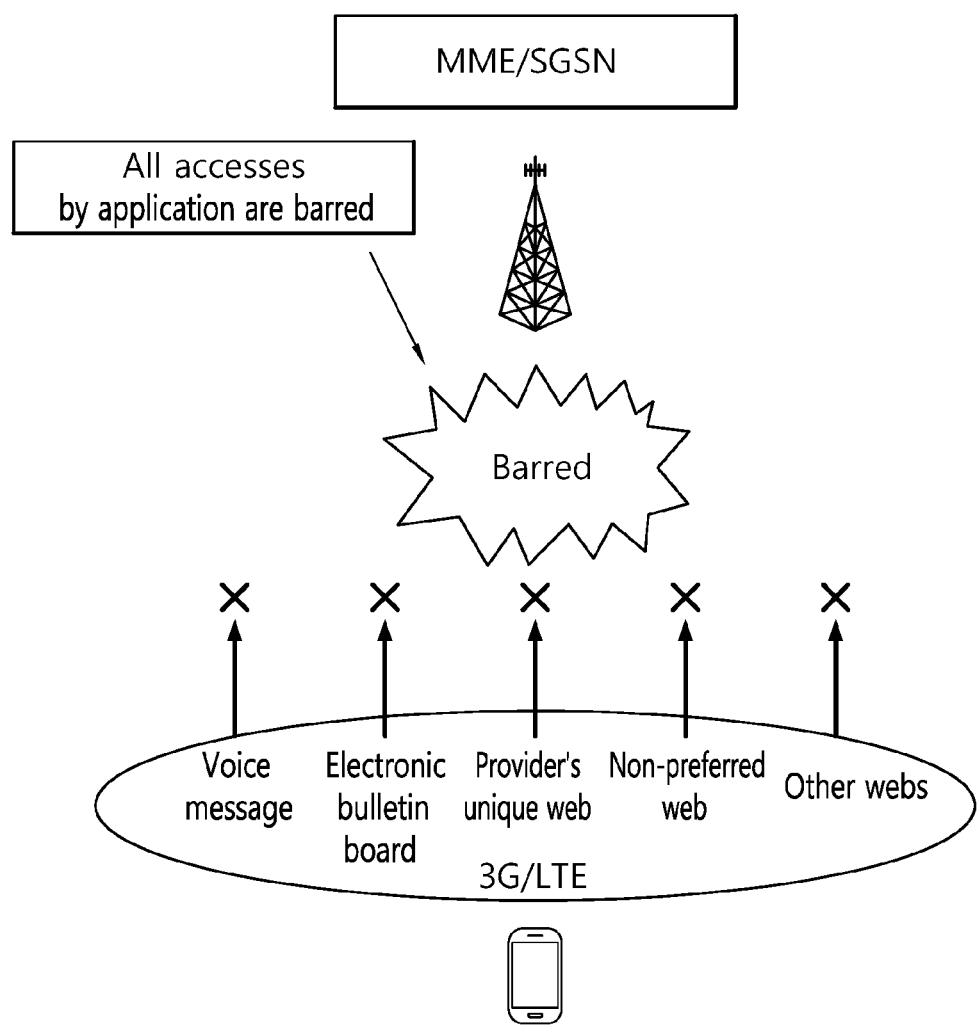
FIG. 8 illustrates an example that all accesses by all applications are barred when ACB is applied.

FIG. 8 illustrates an example that all accesses by all applications are barred when ACB is applied.

As can be seen with reference to FIG. 8, when it is determined to apply ACB once, accesses by all applications of UE (however, except a response to an urgent service or paging) are barred.

As such, accesses by all applications are barred, a differentiated service is unavailable. Such a problem causes network resource waste and degrades user experience, consequently.

Accordingly, in a situation of network overload and a congested situation, a method is required for differentiating Mobile Originating service (e.g., mobile originating voice call or mobile originating data) for each of specific application groups/categories. However, there has been no method for implementing it in the conventional art.

<Introduction of Application Specific Congestion Control Data Communication (ACDC)>

As a method for differentiating a normal Mobile Originating (MO) service, for example, an originating call, an originating data, an originating IMS voice and an originating IMS video, the Application specific Congestion control for Data Communication (ACDC) is proposed.

Figure 9:
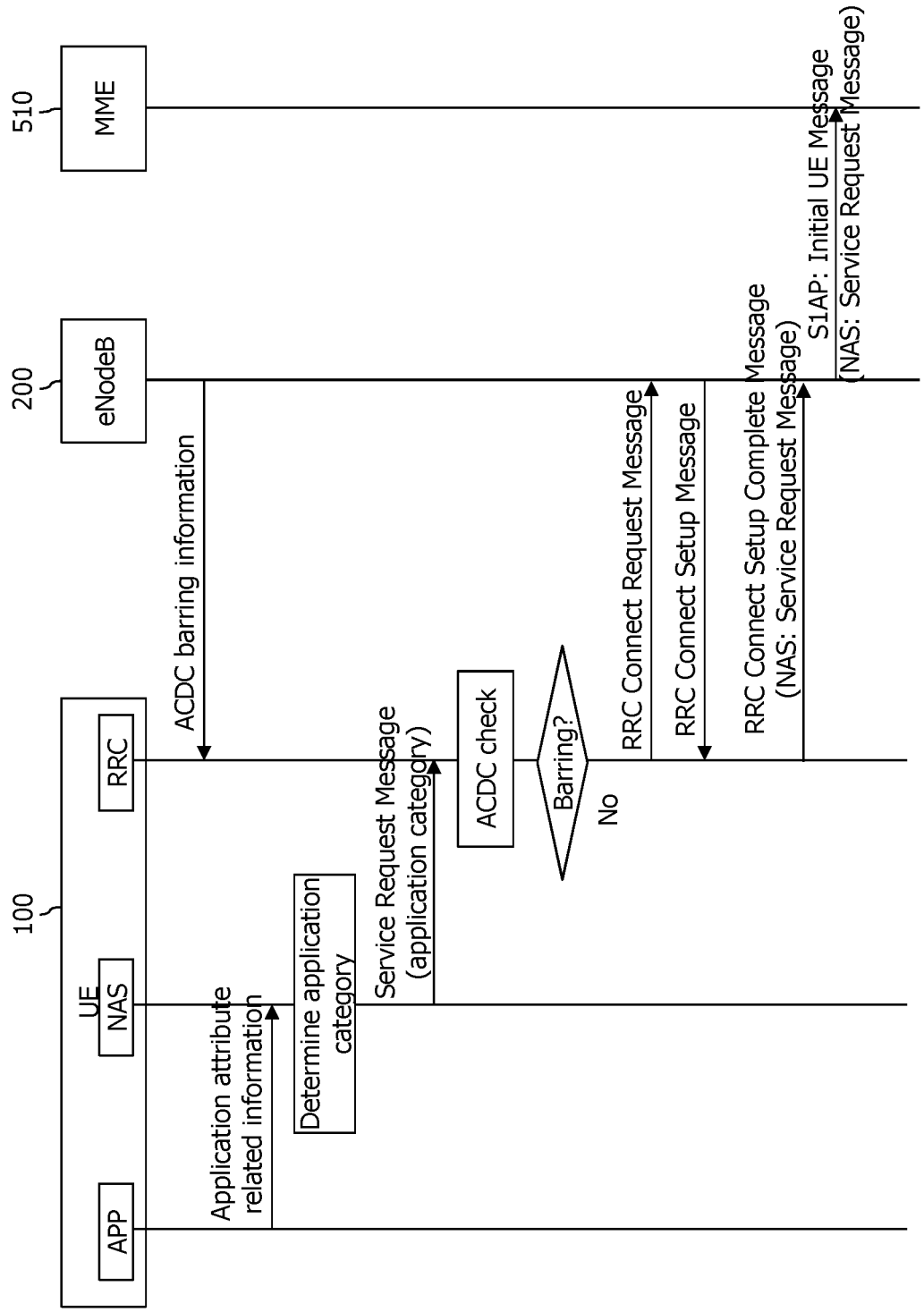
FIG. 9 is a signal flowchart illustrating a procedure according to the ACDC.

FIG. 9 is a signal flowchart illustrating a procedure according to the ACDC.

The procedure is described with reference to FIG. 9 as below.

First, a network (e.g., eNB) may provide ACDC barring information to a UE through SIB.

Meanwhile, in the case that a specific application is executed in the UE 100 and a data communication service is requested by the specific application, the application layer that manages the execution of the specific application provides application attribute related information to a NAS layer.

Then, the NAS layer of the UE 100 determines an application category for the ACDC based on the application attribute related information received from the application layer.

Subsequently, when the NAS layer of the UE 100 starts a service request procedure for service connection (a transmission of SERVICE REQUEST message or a transmission of EXTENDED SERVICE REQUEST message), the NAS layer of the UE 100 forwards the information for the application category to an AS layer (i.e., RRC layer).

Before the AS layer (i.e., RRC layer) of the UE 100 performs the service request procedure of the NAS layer (a transmission of SERVICE REQUEST message or a transmission of EXTENDED SERVICE REQUEST message), based on the category of the application and the ACDC barring information received from the network, the AS layer (i.e., RRC layer) of the UE 100 performs the ACDC barring check, and accordingly, determines whether to permit the service request procedure or not.

In the case that the service request procedure is permitted as a result of the ACDC barring check, the AS layer (i.e., RRC layer) of the UE 100 transmits an RRC Connect Request message to an eNodeB 200.

As described above, the service requested by the application which is executing in a UE may be differentiated and allowed or barred through the ACDC.

<Machine Type Communication (MTC) Communication>

The Machine Type Communication (MTC) means a communication established between a machine and a machine, in which a person is excluded, and the device used in this case is referred to an MTC device. The service provided through an MTC device is discriminated from the communication service in which a person intervenes, and may be applied to various ranges of services.

Figure 10:
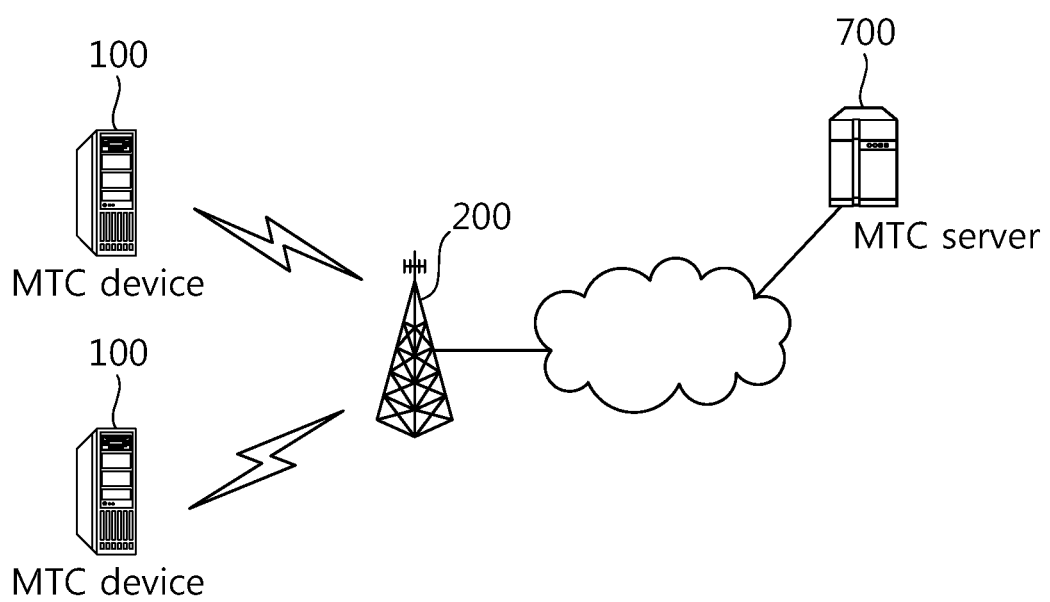
FIG. 10 illustrates an example of the Machine Type communication (MTC) communication.

FIG. 10 illustrates an example of the Machine Type communication (MTC) communication.

The Machine Type Communication (MTC) is referred to information interchange between MTC devices 100 through an eNodeB 200 in which human interaction is not accompanied or information interchange between an MTC device and an MTC server 700 through an eNodeB.

The MTC server 700 is an entity that communicates with an MTC device 100. The MTC server 700 executes an MTC application and provides a MTC-specific service to the MTC device.

The MTC device 100 is a wireless device that provides an MTC communication, and may be fixed or mobile.

However, in coverage of an eNB, a large number of MTC devices may be disposed. Accordingly, this leads to a result that network congestion becomes serious more and more.

Figure 11:
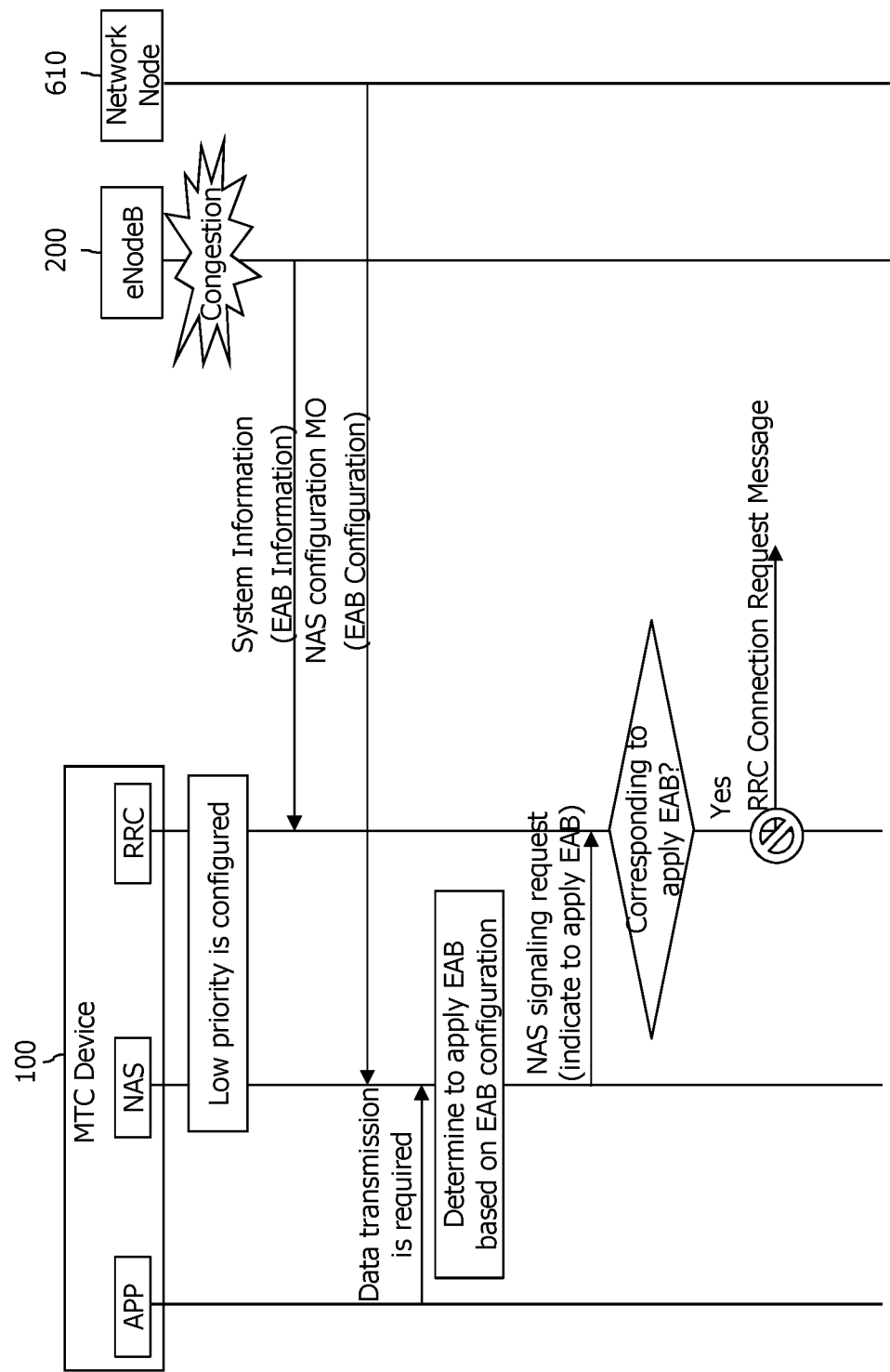
FIG. 11 illustrates an example to which Extended Access Barring (EAB) for solving a congestion caused by an MTC device.

FIG. 11 illustrates an example to which Extended Access Barring (EAB) for solving a congestion caused by an MTC device.

As shown in FIG. 11, an MTC device is configured as low priority. Further, in order to solve the congestion caused by the MTC device, an eNB broadcasts system information that includes EAB information. The system information including the EAB information may be system information block (SIB) type 14.

TABLE 3

| SIB Type14 description |
|---|
| eab-BarringBitmap |
| Bitmap of EAB for access class (AC) 0 to 9. In the bitmap, the leftmost bit is for AC 0, and the second bit is for AC 1. |
| eab-Category |
| Indicates the category of UEs for which EAB applies. |
| eab-Common |
| The EAB parameters applied for all PLMN. |
| eab-PerPLMN-List |
| The EAB parameters per PLMN, listed in the order as the PLMN. |

In addition, a network forwards the configuration information on whether a specific MTC device needs to apply EAB, that is, EAB configuration information with being included in NAS configuration Management Object (MO) to the specific MTC device. As such, low priority and EAB are configured, in the MTC device, except for a case corresponding to an Emergency call, a Mobile Terminated (MT) access or a high priority access class (e.g., AC11-15), for the corresponding NAS signaling request procedure (e.g., Attach request procedure, TAU/RAU request procedure, Service request procedure, Extended service request procedure, Data service request procedure, etc.), the NAS layer informs an indication on whether to apply EAB to an RRC layer, and the RRC layer performs an access control by applying EAB when performing an RRC connection establishment procedure with respect to the corresponding request with the EAB application indication.

Accordingly, as shown in FIG. 11, when an application (APP) layer of the MTC device 100 notifies that a data transmission is required, the NAS layer determines to apply EAB based on the EAB configuration. In addition, the NAS layer forwards a NAS signaling request to the RRC layer. At this time, together with the NAS signaling request, the EAB application indication is forwarded together.

The RRC layer of the MTC device determines whether the RRC connection establishment request corresponds to the EAB application based on the EAB application indication. In the case that the EAB is applied, a transmission of an RRC connection establishment request message by the RRC layer is barred (or prohibited).

<Cellular Internet of Things (CIoT) Communication>

MTC communication is also called IoT (Internet of Things) communication because there is no human intervention. Performing IoT communication based on cellular network rather than wireless LAN like Wi-Fi is called CIoT. Unlike wireless LAN, CIoT supports communication which is not based on IP as well as IP-based communication.

Meanwhile, in order to support the CIoT service, the 3GPP has improved the physical layer, that is, RAT (Radio Access Technology). The improved RAT is called NB-IoT (Narrowband-IoT).

The improved RAT for the NB-IoT uses a physical layer which is optimized for very low power consumption (e.g., carrier bandwidth is 180 kHz and subcarrier spacing is 3.75 kHz or 15 kHz).

<Optimization for Data Transmission and Reception of CIoT Devices>

Since the CIoT device transmits and receives a small amount of data, as described above, the CIoT device may operate in a network operating with an improved RAT for NB-IoT, that is, a bandwidth of up to 180 kHz (corresponding to one PRB).

However, even if the CIoT device transmits and receives a small amount of data, since the CIoT device should transmit and receive a large amount of signaling with the network in advance, there is a problem of inefficiency. This will be described with reference to FIG. 12a.

Figure 12A:
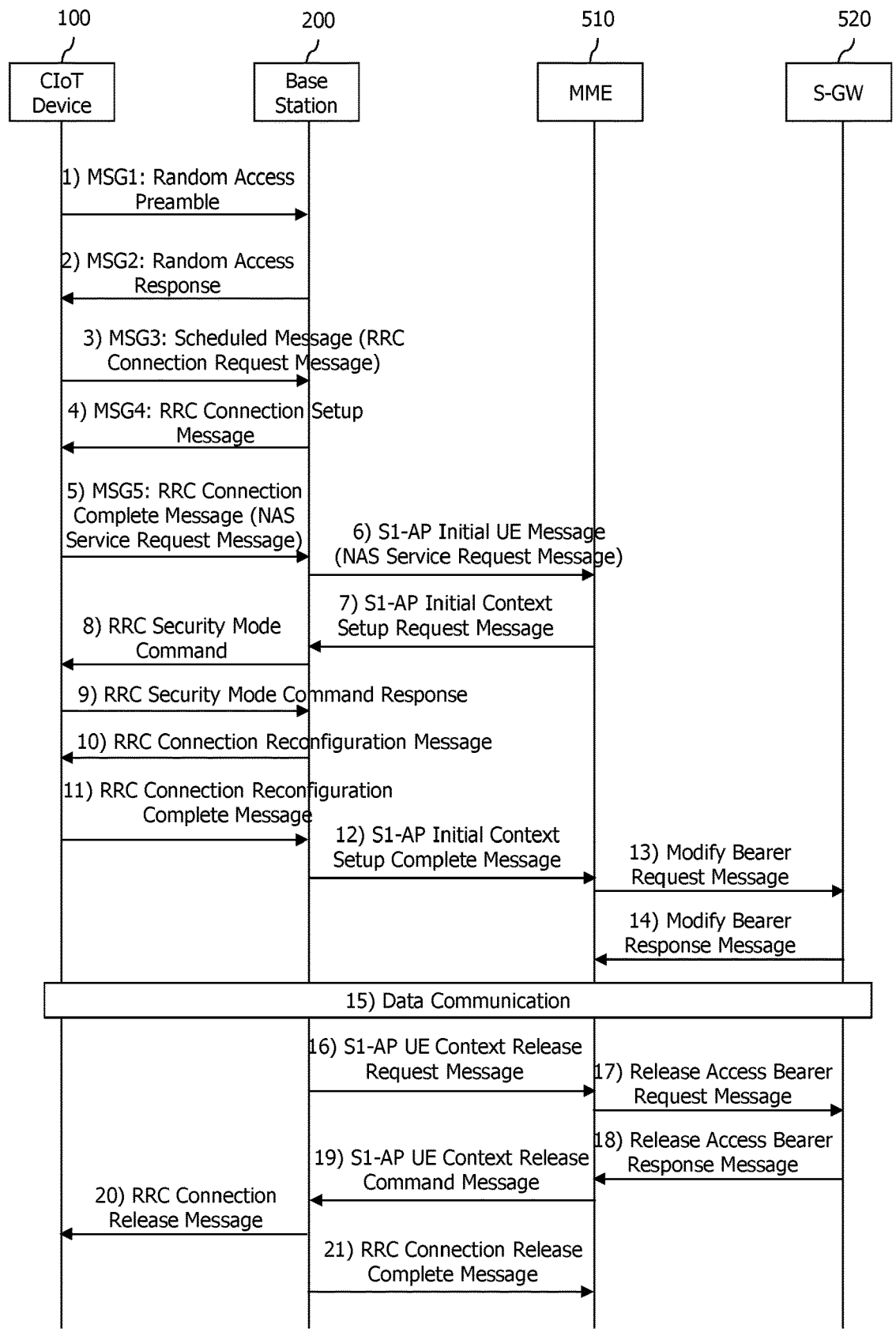
FIG. 12a illustrates a series of procedures that the CIoT device performs for data communication.

FIG. 12a illustrates a series of procedures that the CIoT device performs for data communication.

Hereinafter, the procedures will be described in order with reference to FIG. 12a.

1 to 5) First, the CIoT device 100 performs a random access procedure for data communication. That is, the CIoT device 100 transmits a first message (MSG1), for example, a random access preamble, to an eNB 200. Then, the CIoT device 100 receives a second message (MSG2), for example, a random access response message from the eNB 200. Then, the CIoT device 100 transmits a third message (MSG3), for example, a scheduled message to the eNB 200. The scheduled message may include an RRC Connection Request message. Later, the CIoT device 100 receives a fourth message (MSG4), for example, an RRC Connection Setup message from the eNB 200. Then, the CIoT device 100 transmits a fifth message (MSG5), for example, an RRC Connection Complete message to the eNB 200. The RRC connection complete message may include a NAS service request message.

6 to 7) Then, the eNB 200 transmits an initial UE message based on the S1-AP to the MME 510. The initial UE message may include the NAS service request message. The MME 510 transmits an Initial Context Setup Request message based on the S1-AP to the eNB 200.

8 to 9) Then, the eNB 200 transmits an RRC Security Mode Command (SMC) to the CIoT device and receives an RRC security mode command response.

10 to 11) Thereafter, the eNB 200 transmits an RRC Connection Reconfiguration message to the CIoT 100. The CIoT 100 transmits an RRC Connection Reconfiguration Complete message to the eNB.

12 to 14) The eNB 200 transmits an Initial Context Setup Complete message based on the S1-AP to the MME 510. Then, the MME 510 transmits a bearer modification request message to the S-GW 520 and receives a bearer modification response message from the S-GW 520.

15) Accordingly, the CIoT device 100 may perform data communication.

16 to 19) Meanwhile, when the data communication is completed and the RRC connection is not needed, the eNB 200 transmits a UE context release request message based on the S1-AP to the MME 510. Then, the MME 510 transmits a release access bearer message to the S-GW 520. Then, the S-GW 510 delivers a Release Access Bearer Response message to the MME 510. The MME 510 transmits a UE Context Release Command message based on the S1-AP to the eNB.

20) The eNB 200 transmits an RRC Connection Release message to the UE and transmits an RRC Connection Release Complete message to the MME 510.

As described above, even if the CIoT device 100 transmits and receives a small amount of data, since the CIoT device 100 should exchange a large number of signals with the eNB 200, there is a problem of inefficiency.

In particular, the CIoT device is expected to be located at a fairly high density within the coverage of the base station, in which case a fairly large number of signals may overload the network.

Therefore, there are attempts to optimize the CIoT by using the control plane in the evolved packet service (EPS) and by using the user plane. Each will be described as follows.

1. Control Plane (CP) CIoT EPS Optimization

This is a method of transmitting data by including data in a PDU (Packet Data Unit) of the NAS layer. This is a scheme of transmitting data through a control plane (SRB+S1-AP) for transmitting NAS messages such as Attach of the NAS layer and Tracking Area Update (TAU) without using the user plane setup (DRB+S1-U path) which is necessary for transmission of the existing data. For this, S11-U path is newly defined between an MME and an S-GW. Through the S11-U path newly defined, data may be transmitted. At this time, the security of the data uses the security of the NAS layer instead of the security of the AS layer. As described above, since the security of the AS layer is unnecessary, the Security mode command (SMC) procedure and the like may be omitted. Also, the required RRC signaling is reduced when switching the RRC connection mode.

This will be described with reference to FIG. 12b.

Figure 12B:
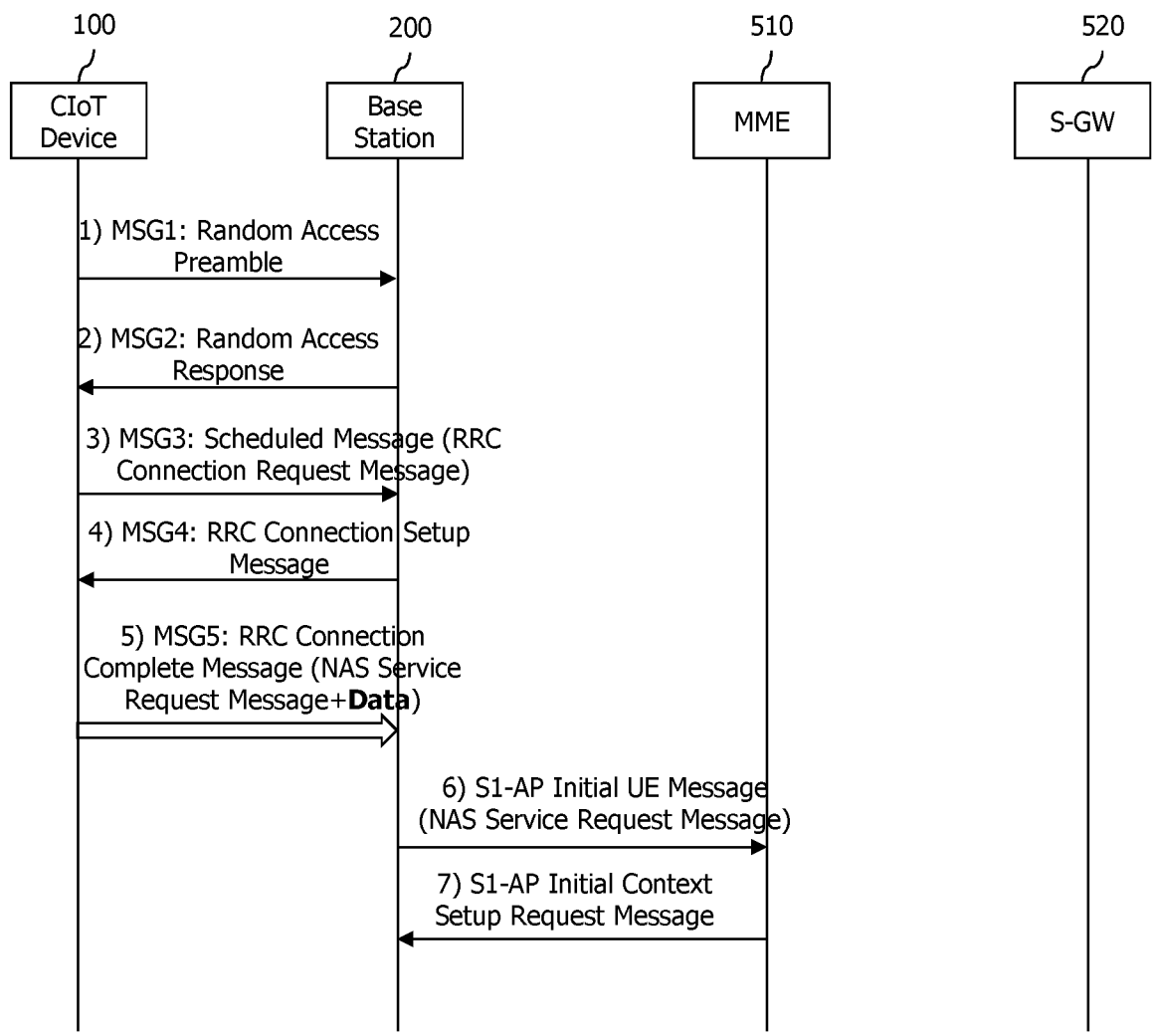
FIG. 12b illustrates a procedure for a CIoT device to transmit data according to a control plane (CP) CIoT EPS optimization.

FIG. 12b illustrates a procedure for a CIoT device to transmit data according to a control plane (CP) CIoT EPS optimization.

As can be seen with reference to FIG. 12b, the CIoT device may include data in the NAS service request message included in the fifth message (MSG5), for example, the RRC connection completion message so as to be transmitted.

That is, when FIG. 12a is compared with FIG. 12b, in FIG. 12a, the CIoT device 100 is inefficient because it may transmit data in the 15th process. However, in FIG. 12b, the CIoT device 100 may transmit data in the 5th process, and improved efficiently.

2. User Plane (UP) CIoT EPS Optimization

In this case, when there is no data transmission and reception, the corresponding context is set to be maintained instead of releasing (deleting) the UE context stored in the CIoT device and the eNB (i.e., UE ID, AS security information, etc.). Further, when there is no data transmission and reception, the CIoT device performs an RRC connection Suspend procedure instead of performing the S1 release procedure. Therefore, when the CIoT device requests the RRC connection again, it may quickly switch from the RRC idle mode to the RRC connection mode. That is, instead of performing the service request procedure for setting up the user plane, an RRC connection resume procedure is performed. Therefore, the number of RRC signals that the CIoT device should transmit and receive to switch from the RRC idle mode (EMM-IDLE) to the RRC connection mode (EMM-CONNECTED) is significantly reduced.

Figure 12C:
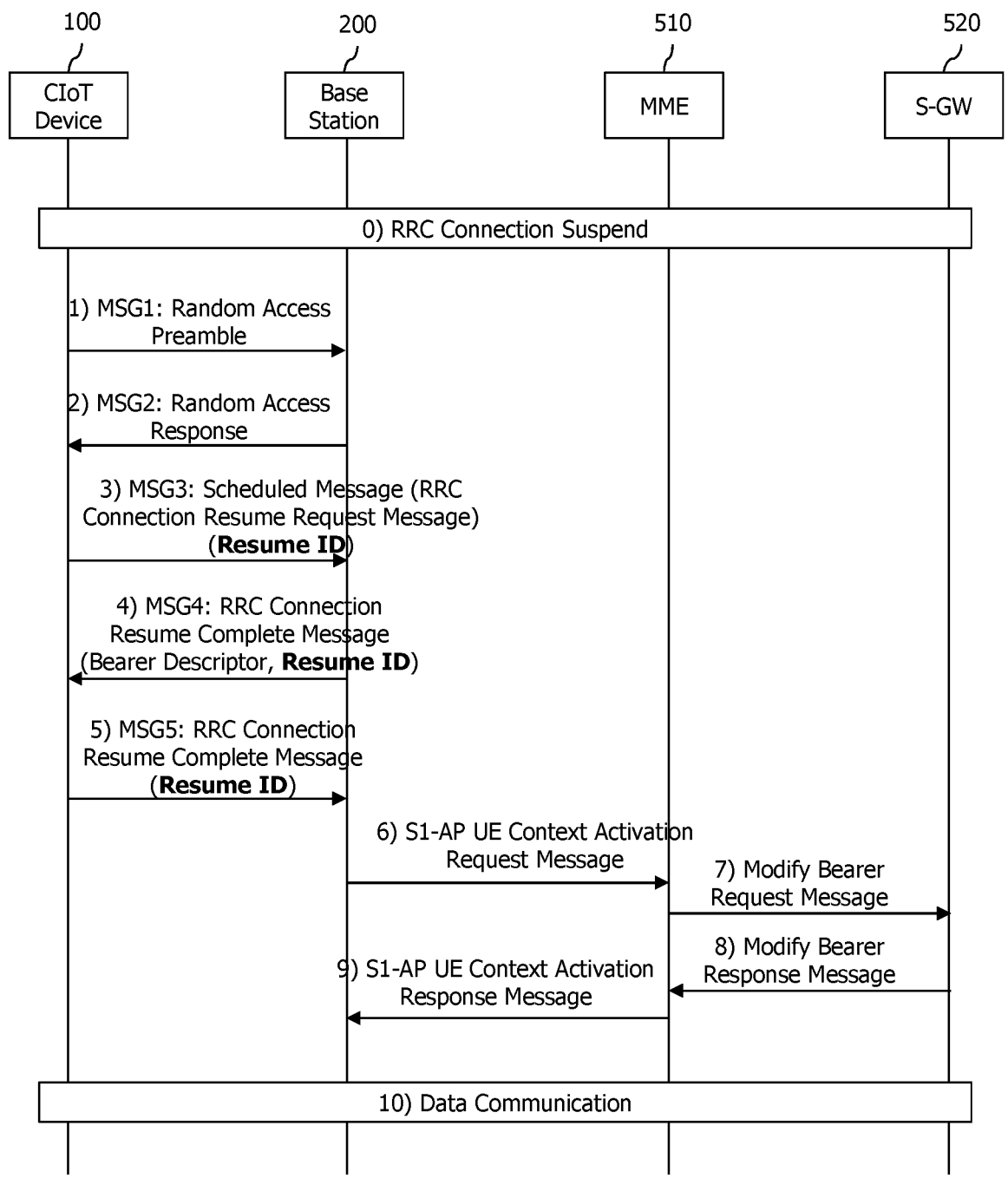
FIG. 12c illustrates a procedure in which a CIoT device transmits data according to a user plane (UP) CIoT EPS optimization.

FIG. 12c illustrates a procedure in which a CIoT device transmits data according to a user plane (UP) CIoT EPS optimization.

0) First, in the case that there is no data transmission and reception, instead of releasing (deleting) the UE context stored in the CIoT device 100 and the eNB 200, the corresponding context was maintained, and instead of performing the S1 release procedure, the RRC connection suspend procedure was performed.

1 to 2) Later, when the data communication is again required, the CIoT device 100 transmits a first message, for example, random access preamble to the eNB 200. In addition, the CIoT device 100 receives a second message, for example, a random access response from the eNB 200.

3) Then, the CIoT device 100 transmits an RRC connection resume request message with being included in a scheduled message. At this time, a resume ID is included in the RRC connection resume request message.

4 to 5) The eNB 200 transmits a fourth message, for example, an RRC connection resume complete message to the CIoT device 100. Then, the CIoT device 100 transmits an RRC connection resume complete message to the eNB. The RRC connection resume complete message also includes the resume ID.

6) The eNB 200 transmits a UE context activation request message based on S1-AP to the MME 510.

7 to 9) Then, the MME 510 transmits a bearer modification request message to the S-GW 520, and receives a bearer modification response message from the S-GW 520. Later, the MME 510 transmits a UE context activation response message to the eNB 200.

10) Accordingly, the CIoT device 100 may perform data communication.

In comparison with FIG. 12a and FIG. 12c, in FIG. 12a, it is inefficient that the CIoT device 100 may transmit data in 15th procedure, but in FIG. 12c, it is improved efficiently since the CIoT device 100 may transmit data in $10^{th}$ procedure.

<Disclosure of the Present Invention>

In NB-IoT RAT, various services which were developed for the existing RAT may not be provided. Particularly, in NB-IoT RAT, access class barring (ACB), EAB, ACDC, SSAC and the like may not be provided.

However, in the CIoT environment, many CIoT devices perform data transmission, and in this case, network overload and congestion situation may occur. However, in the NB-IoT which is an improved RAT for the CIoT, in the case that an access control such as ACB is not provided, it is unclear how to solve the network overload and the congestion situation.

Furthermore, in the case that a CIoT device supports control plane (CP) CIoT EPS optimization only, the CIoT device needs to include user data in a NAS signaling request message (e.g., service request message) of a control plane (CP), but there is no method of performing an access control by distinguishing a NAS signaling request message including user data and a normal NAS signaling request message as such. Owing to this, there is a problem that the NAS signaling request message of the control plane (CP) including a small amount of data may be failed in transmission in a congestion situation according to the control plane (CP) CIoT EPS optimization. Accordingly, user experience is degraded, and network resource may be wasted.

2. Second Problem

Meanwhile, in the case that a CIoT device and a network support a control plane (CP) CIoT EPS optimization, in network congestion/overload situation, the control plane (CP) CIoT EPS optimization is performed for control of overload.

The operation related to the overload control is described below with reference to the drawing.

Figure 13A:
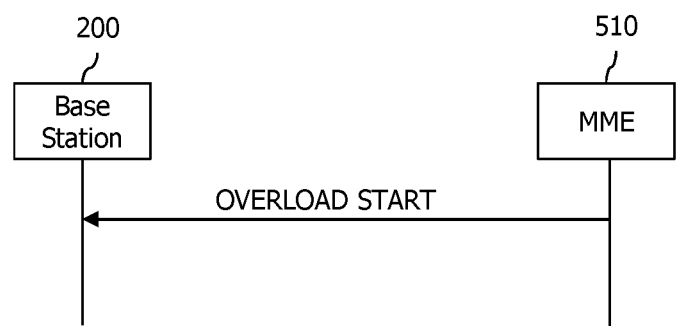
FIG. 13a is an exemplary diagram illustrating a procedure of requesting to reduce signaling to an eNB by a network owing to overload.

FIG. 13a is an exemplary diagram illustrating a procedure of requesting to reduce signaling to an eNB by a network owing to overload.

Referring to FIG. 13a, when a network is in overload state, a network node (e.g., MME as shown) transmit a message for requesting to reduce signaling, for example, an OVERLOAD START message to an eNB.

When the eNB receives the message (e.g., the OVERLOAD START message), the eNB determines that the network node (e.g., MME) is in an overload state.

The OVERLOAD START message includes one of the following indications.

An indication to reject an RRC connection establishment (e.g., including a value of RRC establishment cause field configured as "mo-data", "mo-VoiceCall" or "delayTolerantAccess") for non-emergency mobile originated data transmission An indication to reject an RRC establishment cause field configured as an RRC connection establishment for signaling (e.g., including a value of RRC establishment cause field configured as "mo-data", "mo-signalling", "mo-VoiceCall" or "delayTolerantAccess")

An indication to not accept an RRC connection request (e.g., including an establishment cause value set to "mo-data" or "delayTolerantAccess") requested for CIoT devices that support only the control plane (CP) CIoT EPS optimization to transmit data The OVERLOAD START message may further include an indication to reduce traffic overload, for example, Traffic Load Reduction Indication.

In the case that such an indication is included, the eNB reduces traffic by rejecting a part of the signaling traffic based on probability.

Figure 13B:
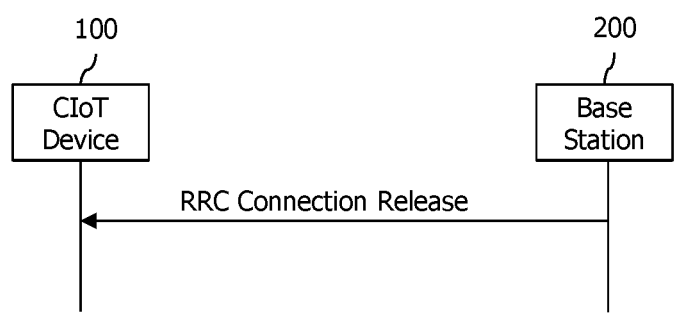
FIG. 13b is an exemplary diagram illustrating a procedure for an eNB to release an RRC connection for overload control.

FIG. 13b is an exemplary diagram illustrating a procedure for an eNB to release an RRC connection for overload control.

Referring to FIG. 13b, an eNB requests an RRC connection release to the CIoT device 100 for overload control. The RRC connection release includes release of all radio resources as well as a radio bearer.

Alternatively, the eNB may request suspend of an RRC connection for the overload control. The suspension of an RRC connection includes suspend of an established radio bearer.

The CIoT device operates as below when receiving the message.

In the case that the message includes an extended back-off timer which is applied to a CP timer (e.g., extended Wait-Time-CPdata), and in the case that the CIoT device supports the Control Plane (CP) CIoT EPS optimisation, an RRC layer of the CIoT device forwards the timer to a higher layer (e.g., NAS layer).

Then, the RRC layer of the CIoT device releases or suspends an RRC connection.

As described above, in the case that the Control Plane (CP) CIoT EPS optimisation is supported, an MME transmits the OVERLOAD START message such that an eNB performs an overload control for an RRC connection request (particularly, an RRC connection request for the CP CIoT EPS optimisation) including a value of an establishment cause field which is configured as mo-data or delay tolerant. Then, the eNB rejects the RRC connection request (particularly, an RRC connection request for the CP CIoT EPS optimisation) including the value of an establishment cause field which is configured as mo-data or delay tolerant, and provides the extended back-off timer to the NAS layer of the CIoT device through an RRC connection release request message. Then, the RRC layer of the CIoT device provides the extended back-off timer to the NAS layer, and does not perform a transmission procedure of the RRC connection request message including the value of an establishment cause field which is configured as mo-data or delay tolerant.

However, there is a problem that the NAS layer of the CIoT device is unable to distinguish the NAS signaling request for the RRC connection request (particularly, an RRC connection request for the CP CIoT EPS optimisation) including the value of an establishment cause field which is configured as mo-data or delay tolerant from the existing normal NAS signaling request.

Likewise, there is a problem that the RRC layer of the CIoT device is unable to distinguish the NAS signaling request for the RRC connection request (particularly, an RRC connection request for the CP CIoT EPS optimisation) including the value of an establishment cause field which is configured as mo-data or delay tolerant from the existing normal RRC connection request.

Such a problem may degrade a user experience and waste network resources, consequently.

<Disclosure of the Present Invention>

Accordingly, a disclosure of the present specification provides proposals to solve the problem described above.

I. Proposal 1 of the Present Specification to Solve the First Problem

When a CIoT device using NB IoT RAT supports only the control plane (CP) CIoT EPS optimization or both the control plane (CP) CIoT EPS optimization and the user plane (UP) CIoT EPS optimization, in order for the device to transmit an NAS signaling request message with user data to a network node (e.g., MME/SGSN), according to proposal 1 of the present specification, the NAS layer of the device may set a call type field and an RRC establishment cause field as follows and transmit the call type and RRC establishment cause to an AS layer (e.g., RRC layer).

With respect to Attach Request, TAU/RAU Request, Service Request, Extended Service Request, Control Plane (CP) Service Request message with user data, The call type field is set as one of Mobile Originating (MO) CP signaling and Mobile Originating (MO) CP calls or set as a value indicating a new call type for the Control Plane (CP) CIoT Optimization. Further, the RRC establishment cause may be set as one of MO CP data and MO CP signaling or set as a value indicating a new cause for the CP CIoT Optimization.

Alternatively, instead of being set as MO signaling or MO call as the same as the existing case, the RRC establishment cause is set as one of MO CP data and MO CP signaling or set as a value indicating a new cause for the CP CIoT Optimization.

Meanwhile, an eNB may provide access barring-related information for NAS signaling request with user data together with access barring-related information for the existing NAS signaling request.

The AS layer (e.g., RRC layer) may perform the access barring examination for NAS signaling request including the user data or skip the access barring examination, different from the normal NAS signaling request, based on the call type field and/or the RRC establishment cause field provided by the NAS layer and the access barring information provided from the eNB.

Meanwhile, in response to the service request message of CP, the NAS layer of the device may forward the RRC establishment cause field and the call type field represented in the table below to the AS layer.

TABLE 4

| NAS procedure | RRC establishment cause | Call type |
|---|---|---|
| Service request procedure | If a CP SERVICE REQUEST is a response to paging and the service type is mobile terminating (MT) request, the RRC establishment cause is set to "MT access". | terminating call |
| | If a CP SERVICE REQUEST is to transfer user data via control plane and the service type is set to MO request, the RRC establishment cause is set to "MO CP data" or "MO CP signaling" or new establishment cause. | originating call or set to "MO CP signaling" or "MO CP call" as a new request type or set to a new request type |

Meanwhile, according to the present specification, a new Access Barring (AB) mechanism is proposed. The Access Barring (AB) mechanism is applied for an RRC connection request of a wireless device that uses NB-IoT RAT or an RRC connection request of a wireless device that uses CP CIoT EPS optimization method or UP CIoT EPS optimization method.

For this, an eNB may broadcast information related to the new Access Barring (AB) mechanism. At this time, the broadcasting may be performed through SIB type 2 or SIB type 14.

In the case that the SIB type 2 is used, the SIB type 2 shown in Table 2 above may further include the fields represented in the table below.

TABLE 5

| Field | SIB type 2 |
|---|---|
| ab-BarringMO-CPData | Indicates whether an RRC connection request including an RRC establishment cause field set to MO CP data is subject to an examination of Access Barring (AB) |
| ac-BarringSkipForMO-CPData | Indicates whether an examination of Access Barring (AB) is skipped for an RRC connection request including an RRC establishment cause field set to MO CP data |
| ac-BarringSkipForMO-CPSignalling | Indicates whether an examination of Access Barring (AB) is skipped for an RRC connection request including an RRC establishment cause field set to MO CP signaling |
| cp-CIoT-EPS-Optimisation | Indicates whether a wireless device is allowed to establish a connection for CP CIoT EPS optimization |
| cp-CIoT-EPS-Optimisation | Indicates whether a wireless device is allowed to establish a connection for UP CIoT EPS optimization |

Meanwhile, in the case that the SIB type 14 is used, the fields as represented in the table below may be further included.

TABLE 6

SIB type 14

| Field | Description |
| --- | --- |
| ab-BarringBitmap | Indicates access class barring for access classes 0 to 9. The leftmost bit is for access class 0. |
| ab-BarringCPDataBitmap | Indicates access class barring for Data via Control Plane for access classes 0 to 9. The leftmost bit is for access class 0. |
| ab-BarringMO-CPData | Indicates whether an RRC connection request including an RRC establishment cause field set to MO CP data is subject to access barring (AB). |
| ac-BarringSkipForMO-CPData | Indicates whether an examination of Access Barring (AB) is skipped for an RRC connection request including an RRC establishment cause field set to MO CP data |
| ac-BarringSkipForMO-CPSignalling | Indicates whether an examination of Access Barring (AB) is skipped for an RRC connection request including an RRC establishment cause field set to MO CP signaling |
| ab-Category | Indicates a category of a device to which AB is applied |

Meanwhile, this will be described in more detail with reference to the drawings as below.

Figure 14A:
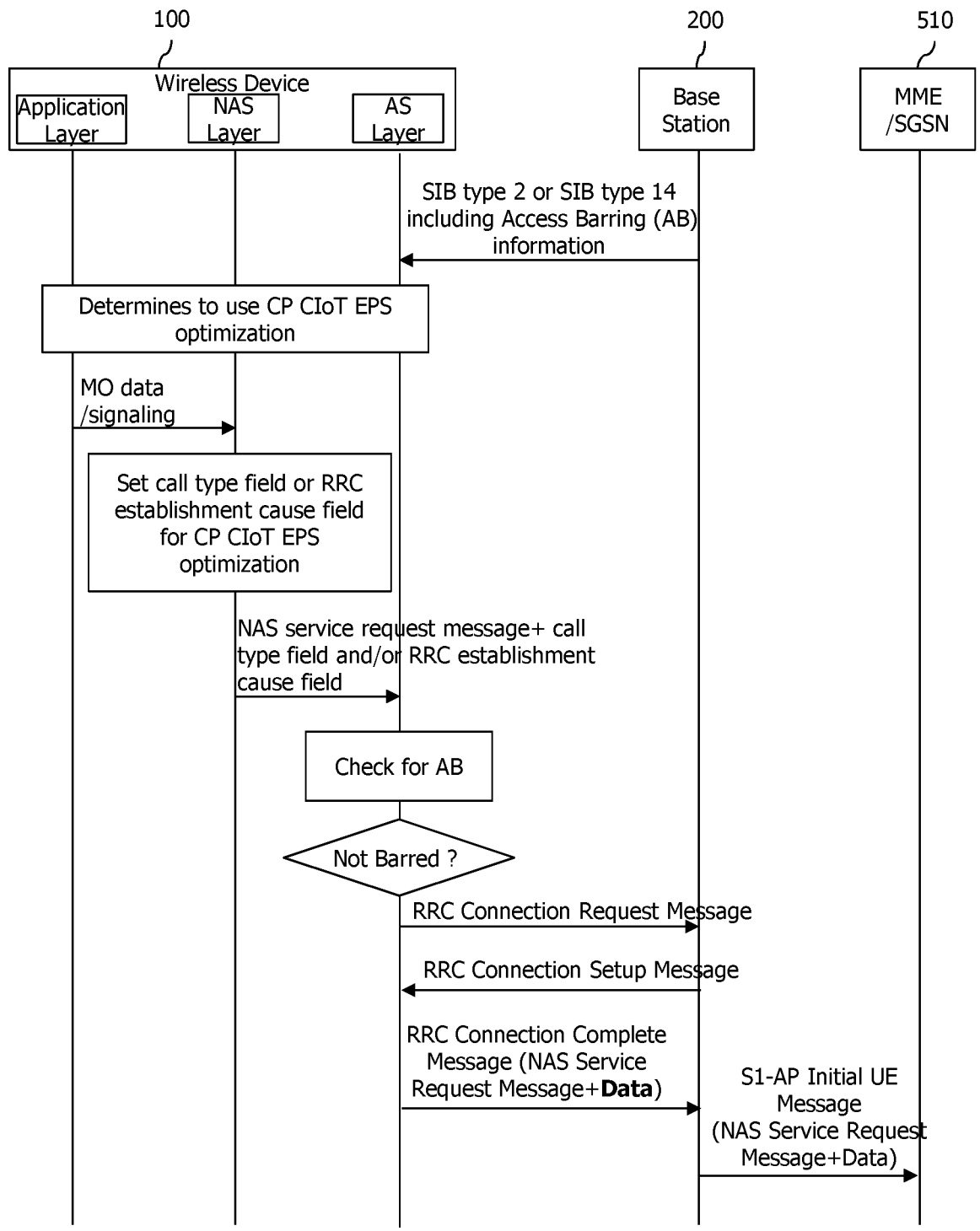
FIGS. 14a and 14b are signal flowcharts illustrating a procedure according to proposal 1 of the present specification.
Figure 14B:
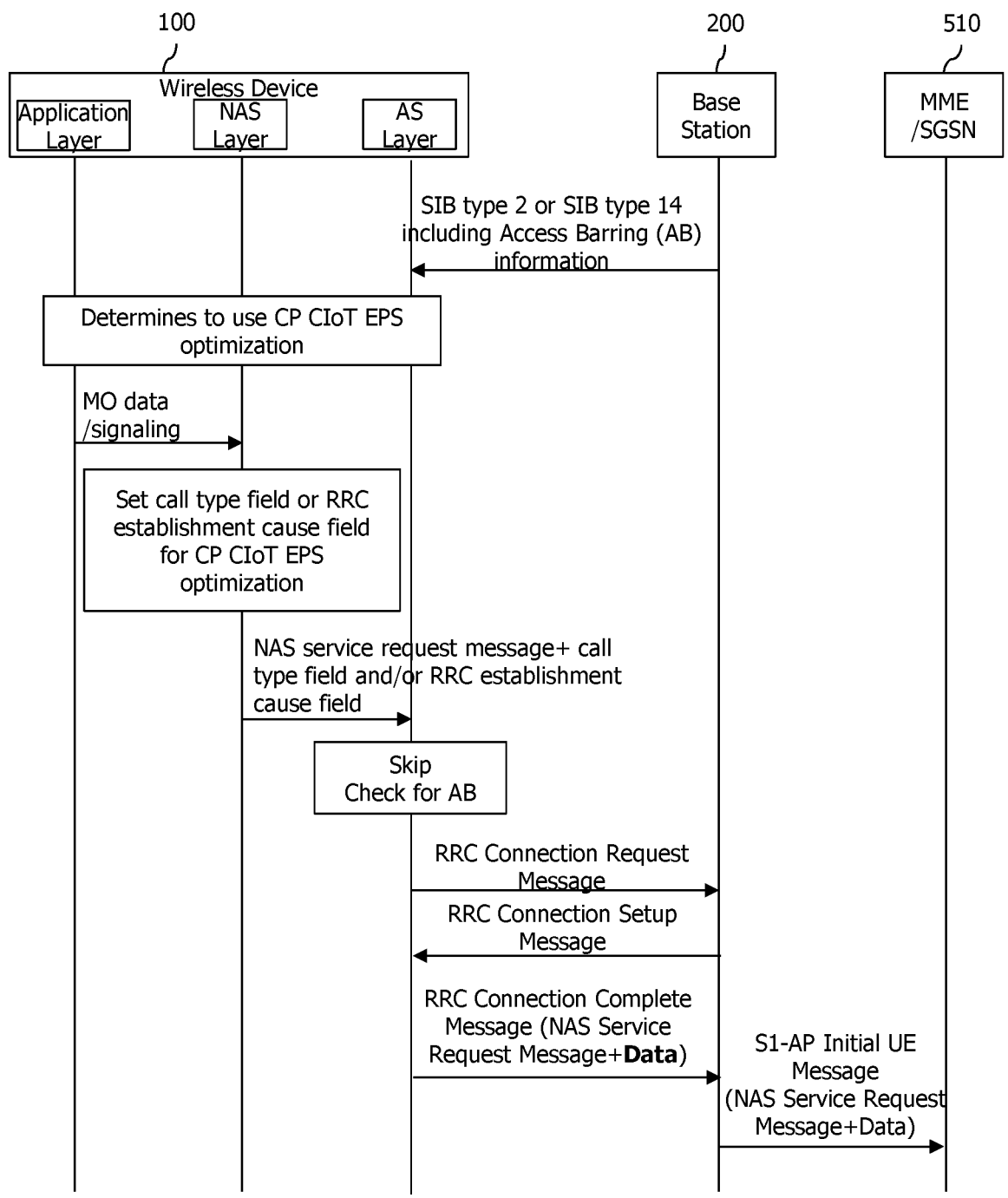

FIGS. 14a and 14b are signal flowcharts illustrating a procedure according to proposal 1 of the present specification.

As can be seen with reference to FIGS. 14a and 14b, first, an eNB 200 may broadcast information related to Access Barring (AB) mechanism. The information related to Access Barring (AB) mechanism may be broadcasted with being included in SIB type 14 as represented in Table 6. Alternatively, the information related to Access Barring (AB) mechanism may be broadcasted with being included in SIB type 2 as represented in Table 5.

Meanwhile, a wireless device (e.g., CIoT device) 100 determines to transmit user data through a NAS signaling request of control plane (CP) using the CP CIoT EPS optimization.

Accordingly, the Application layer of the wireless device (e.g., CIoT device) 100 forwards MO data/signaling to the NAS layer.

Then, as represented in Table 4, the NAS layer sets the RRC establishment cause field to either one of MO CP data and MO CP signaling or a value indicating a new establishment cause for the CP CIoT EPS optimization. In addition, the NAS layer sets the call type field to either one of MO CP signaling and MO CP call or a new request type for the CP CIoT EPS optimization. Alternatively, the NAS layer sets the call type field to MO signaling or MO call as previously, but sets the RRC establishment cause field to either one of MO CP data and MO CP signaling or a value indicating a new establishment cause for the CP CIoT EPS optimization.

Further, the NAS layer forwards a NAS service request message including the user data, the RRC establishment cause field and the call type field to the AS layer.

At this time, as shown in FIG. 14b, in the case that the call type field provided from the NAS layer is set to MO CP signaling, MO CP call or a new request type for the CP CIoT EPS optimization and in the case that ac-BarringSkipForMO-CPData or ac-BarringSkipForMO-CPSignalling of Table 5 or Table 6 received from the eNB indicates that the examination for access barring (AB) is to be skipped, the AS layer may skip the examination for access barring (AB).

However, in the case that ac-BarringSkipForMO-CPData or ac-BarringSkipForMO-CPSignalling of Table 5 or Table 6 received from the eNB indicates that the examination for access barring (AB) is not to be skipped, as shown in FIG. 14a, the AS layer performs the examination for access barring (AB). Particularly, in the case that the call type field provided from the NAS layer is set to MO CP signaling, MO CP call or a new request type for the CP CIoT EPS optimization, the AS layer performs the examination for access barring (AB) by using a timer (e.g., T3xy) as Marring timer and using ab-BarringMO-CPData of Table 5 or Table 6 received from the eNB as a barring parameter. Alternatively, in the case that the establishment cause field provided from the NAS layer is set to MO CP data, MO CP signaling or a new cause for using the CP CIoT EPS optimization, the AS layer performs the examination for access barring (AB) by using a timer (e.g., T3xy) as Tbarring timer and using ab-BarringMO-CPData of Table 5 or Table 6 received from the eNB as a barring parameter.

When the examination for access barring (AB) is going to be performed, the access to a cell is already barred by ACB, The examination for access barring (AB) is described in more detail as below.

In the case that the access class of the device has one value among 0 to 9, and the corresponding bit is set to 0 in ab-BarringCPDataBitmap, In addition, in the case that the NAS layer is intended to transmit an RRC connection establishment request message including the call type field set to MO CP signaling or MO CP call or intended to transmit an RRC connection establishment request message including a new call type for the CP CIoT EPS optimization, and in the case that ab-BarringForMO-CPData is set to false, The AS layer regards that the access is not barred.

On the other hand, in the case that the device has one or more access classes among access classes 11 to 15, and the corresponding bit is set to 0 in ab-BarringForSpecialAC, The AS layer regards that the access is not barred.

That is, in the case that the NAS layer is informed that a transmission of the RRC connection request including the RRC establishment cause field set to a normal MO call from the AS layer previously but a transmission of a new service request message is started for transmitting user data through control plane, the NAS layer may start a procedure for transmitting the service request message.

Meanwhile, as a result of the examination for access barring (AS), in the case that it is determined to be barred, the AS layer forwards an indication indicating the RRC connection establishment or the RRC connection resume is failed to the NAS layer, and stop the related operation. And, the AS layer may drive timer T3xy.

Particularly, when it is determined to be barred as a result of the examination for access barring (AS), unless timer T3xy and timer Marring are not driving, the AS layer generates rand which is a uniformly distributed random value to fulfill range 0≤rand<1.

In addition, the AS layer drives timer Tbarring which is set to a timer value calculated as below by using ac-BarringTime in access barring parameters.

"Tbarring"=(0.7+0.6*rand)*ac-BarringTime;

When the NAS layer receives an indication indicating that the access is failed due to the barring, the NAS layer stops the procedure for transmission of the NAS signaling request including user data. And, the NAS layer does not perform a procedure for transmitting a NAS signaling request again until receiving an indication that the barring is alleviated from the AS layer.

Meanwhile, when the timer T3xy is terminated or stopped, unless the timer T302 is not driving, the AS layer of the device may inform that the access barring is alleviated for the RRC connection establishment request or the RRC connection resume including the call type set to MO CP signaling or MO CP call or the call type set to a new cause for using the CP CIoT EPS optimization to the NAS layer.

In addition, when the timer T302 is terminated or stopped, unless the timer T302 is not driving, the AS layer may inform that the access barring is alleviated for the RRC connection establishment request or the RRC connection resume including the call type set to MO CP signaling or MO CP call or the call type set to a new cause for using the CP CIoT EPS optimization to the NAS layer.

On the other hand, in a network congestion situation, in the case that the RRC establishment cause field in the received RRC connection request message is set to MO CP data or MO CP signaling or the RRC establishment cause field is set to a new cause for the CP CIoT EPS optimization, the eNB may discriminate the RRC connection request message from other RRC connection request message. That is, the eNB may process the RRC connection request message with high priority or low priority. Here, the processing with high priority may mean that barring ratio is lowered so as to be barred hardly. On the contrary, the processing with low priority may mean that barring ratio is higher so as to be barred well.

The eNB may transmit an RRC connection establishment accept message (i.e., RRC connection setup message) or an RRC connection establishment reject message in response to the reception of the RRC connection request message. The RRC connection establishment reject message may include a back-off timer value, an extended back-off timer value or a new back-off timer value. The new back-off timer value is designed for distinguishing use of the CP CIoT EPS optimization. In the case that the back-off timer value is set to maximum 16 second and the extended back-off timer value is set to maximum 1800 second, the new back-off timer value may be set to maximum 8 second for high priority processing or maximum 3600 second for low priority processing.

Meanwhile, in the case that low priority is set to the NAS signaling, the NAS layer of the device may forward the RRC establishment cause field set to delay tolerant with the NAS signaling request (e.g., Attach request, TAU request, Service request, etc.) to the AS layer. As such, in the case that a device set to low priority uses the CP CIoT EPS optimization, according to an embodiment, the NAS layer of the device may not set the RRC establishment cause field to the delay tolerant, but set to MO CP data or MO CP signaling and forward it to the AS layer. Alternatively, the NAS layer of the device may set the RRC establishment cause field to a new cause for the CP CIoT EPS optimization and forward it to the AS layer.

By this process, in the case that a device supports the CP CIoT EPS optimization, a transmission of the NAS signaling request including user data and a transmission of the NAS signaling request not including user data are distinguished, and accordingly, the access barring examination may be performed.

II. Proposal 2 of the Present Specification to Solve the First Problem

Hereinafter, in describing proposal 2 of the present specification, only the contents distinguished from proposal 1 of the present specification are described, and the same contents applies the contents of proposal 1 described above.

According to proposal 2 of the present specification, in order to transmit a NAS signaling request message including user data, instead of setting the existing request type and an RRC establishment cause field, a wireless device (e.g., CIoT device) forwards an indication indicating that the NAS signaling request message includes user data according to the CP CIoT EPS optimization to the AS layer.

More particularly, with respect to a NAS signaling request, for example, Attach request, TAU/RAU request, Service request, Extended service request, a Service request message of control plane (CP) including user data, The NAS layer of the device sets a call type to MO signaling or MO call corresponding to the existing call type and forwards it to the AS layer.

In addition, the NAS layer of the device also sets an RRC establishment cause field to MO data and MO signaling as previously.

However, the NAS layer of the device forwards an indication indicating that the NAS signaling request message includes user data according to the CP CIoT EPS optimization to the AS layer.

Meanwhile, this will be described in more detail with reference to the drawing as below.

Figure 15A:
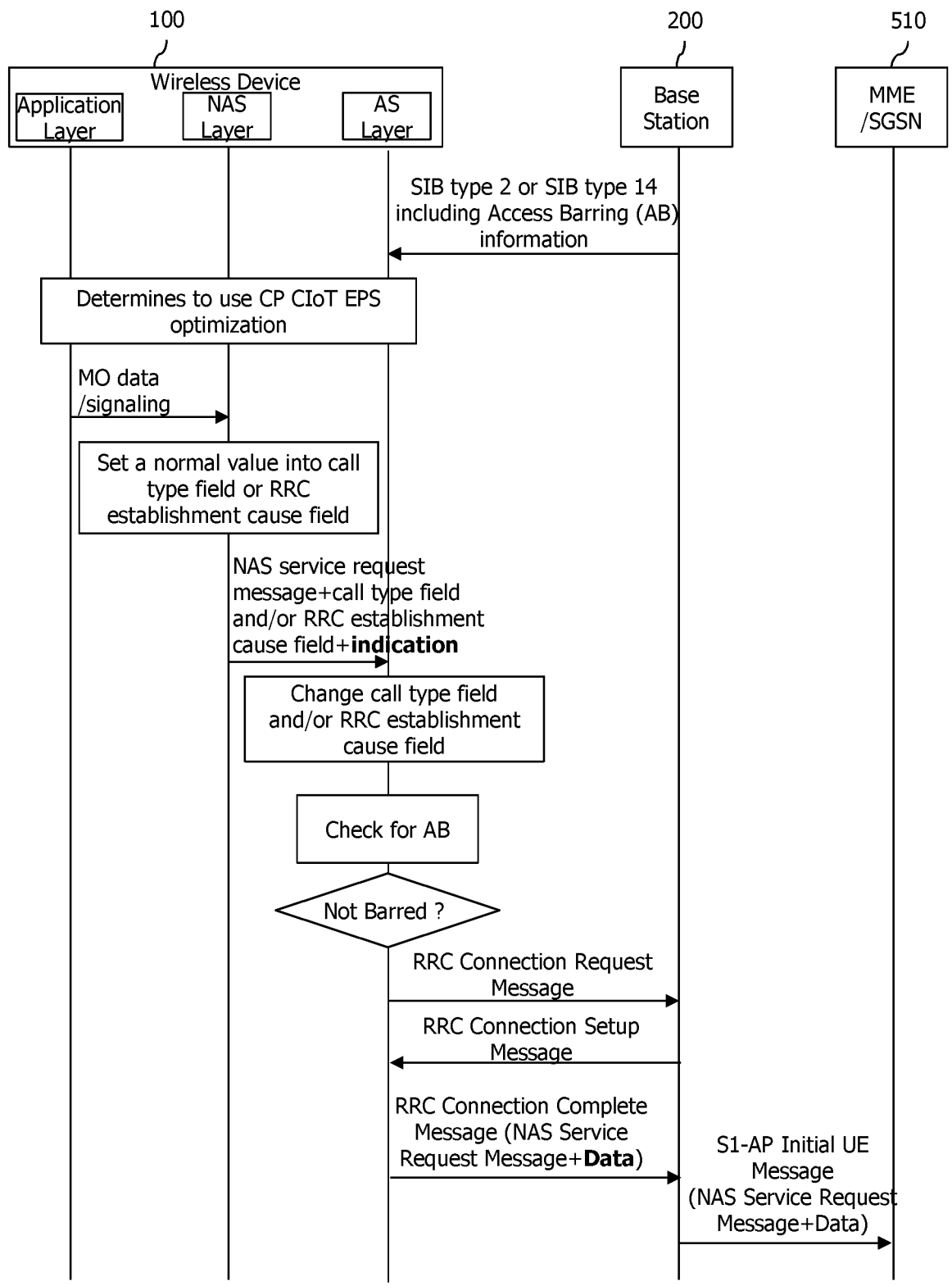
FIGS. 15a and 15b are signal flowcharts illustrating a procedure according to proposal 2.
Figure 15B:
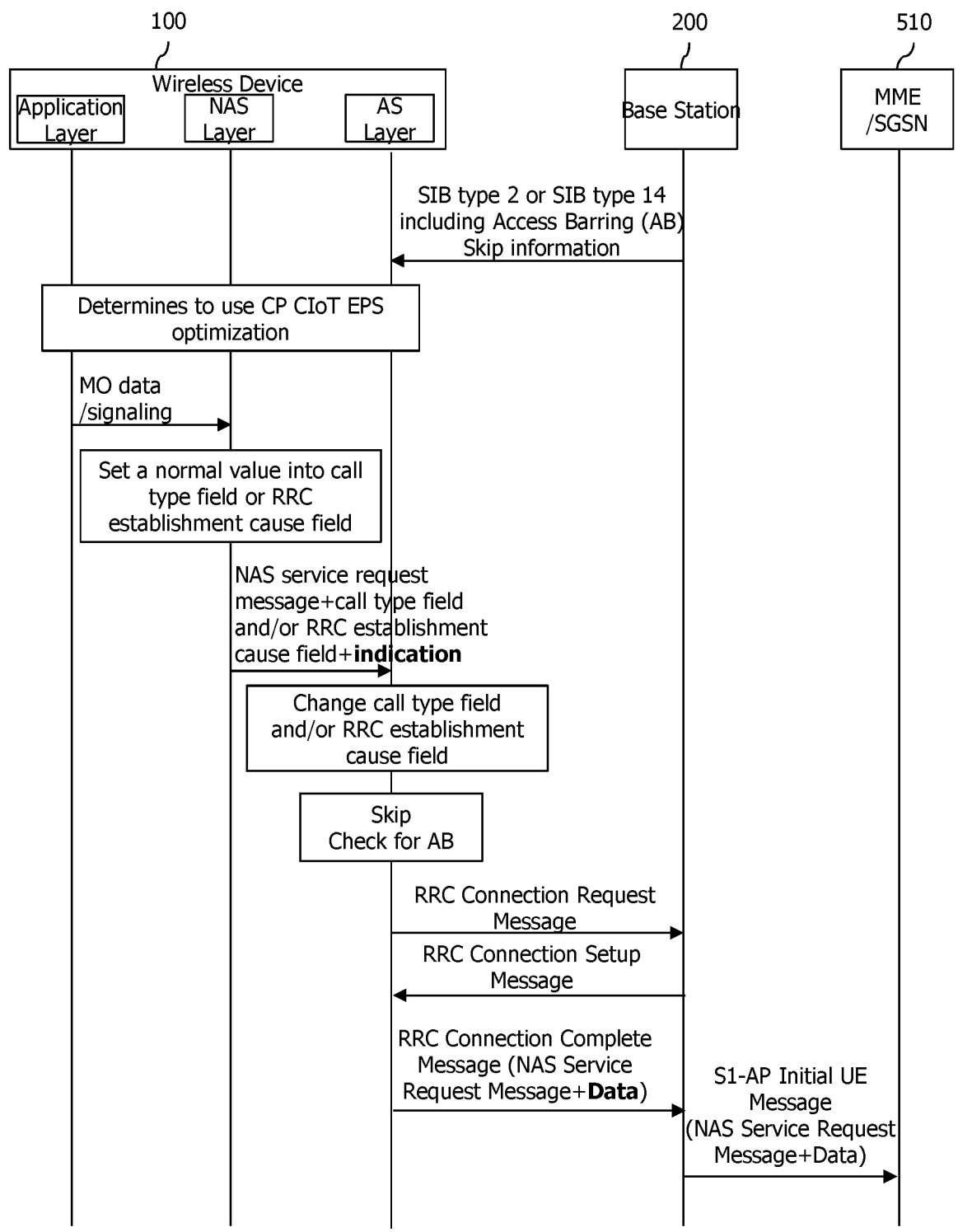

FIGS. 15a and 15b are signal flowcharts illustrating a procedure according to proposal 2.

Hereinafter, in describing FIGS. 15a and 15b, only the contents distinguished from FIGS. 14a and 14b are described, and the same contents applies the contents described above.

In order to transmit a NAS signaling request message including user data, instead of setting the existing request type and an RRC establishment cause field, a wireless device (e.g., CIoT device) 100 forwards an indication indicating that the NAS signaling request message includes user data according to the CP CIoT EPS optimization to the AS layer.

Based on the indication provided from the NAS layer and the information for access barring provided from the eNB, the AS layer (e.g., RRC layer) may change the RRC establishment cause field to MO CP data or MO CP signaling. Alternatively, the AS layer may also change the RRC establishment cause field to a new cause for the CP CIoT EPS optimization.

In addition, based on the indication provided from the NAS layer, the AS layer may perform an examination for access barring (AB) as shown in FIG. 15a with respect to the NAS signaling request including user data, or as shown in FIG. 15b, may skip the examination for access barring (AB). The detailed contents therefor apply the contents for FIG. 14a and FIG. 14b.

Meanwhile, in the case that the NAS layer is informed that a transmission of the RRC connection request including the RRC establishment cause field set to a normal MO call from the AS layer previously but a transmission of a new service request message is started for transmitting user data through control plane, the NAS layer may start a procedure for transmitting the service request message.

Meanwhile, in the case that low priority is set to the NAS signaling, the NAS layer of the device may forward the RRC establishment cause field set to delay tolerant with the NAS signaling request (e.g., Attach request, TAU request, Service request, etc.) to the AS layer. As such, in the case that a device set to low priority uses the CP CIoT EPS optimization, according to an embodiment, the NAS layer of the device may not set the RRC establishment cause field to the delay tolerant, but forward the RRC establishment cause field to MO data or MO signaling or the indication indicating that the NAS signaling request message includes user data according to the CP CIoT EPS optimization to the AS layer. Then, the AS layer uses the RRC establishment cause field set to MO data or MO signaling or changes the RRC establishment cause field to MO CP signaling or MO CP call or to a new cause for the CP CIoT EPS optimization based on the indication.

By this process, in the case that a device supports the CP CIoT EPS optimization, a transmission of the NAS signaling request including user data and a transmission of the NAS signaling request not including user data are distinguished, and accordingly, the access barring examination may be performed.

III. Proposal 3 of the Present Specification to Solve the Second Problem

III-1. Method 1

In order to solve the second problem described above, according to method 1 of proposal 3, instead of the establishment cause set to mo-data or delay tolerant previously for an RRC connection request (particularly, RRC connection request for the CP CIoT EPS optimization), the NAS layer of a CIoT device may set a new establishment cause and/or call type as below, and forward it to the RRC layer.

(i) Attach Request procedure: For an Attach request, generally, the RRC establishment cause value is set to mo-signalling. Therefore, a problem occurs only in a specific situation in which the RRC establishment cause is set to delay tolerant access. The specific situation in which the RRC establishment cause is set to delay tolerant access is the case that a Device properties information element in the Attach request message has low priority indicator and set to "MS is configured for NAS signalling low priority". In this case, the first method proposes to set a value of the RRC establishment cause field and/or call type as below, in order to solve the problem described above.

In the case that the Device properties information element in the ATTACH REQUEST contains low priority indicator and set to "MS is configured for NAS signalling low priority", and requests CP CIoT EPS optimization to transmits user data over control plane, the RRC establishment cause field sets to a new value which is different from the existing value, for example, CP-Delay tolerant, CP-data or delay tolerant for CP data.

At this time, the call type may be set to a new value which is different from the existing value, for example, originating signalling for CP data.

(ii) TAU request procedure: For a TAU request procedure, generally, the RRC establishment cause value is set to mo-signalling. Therefore, a problem occurs only in a specific situation in which the RRC establishment cause is set to delay tolerant access. The specific situation in which the RRC establishment cause is set to delay tolerant access is the case that a Device properties information element in the Attach request message has low priority indicator and set to "MS is configured for NAS signalling low priority". Meanwhile, in the case that the CIoT device uses the CP CIoT EPS optimization, signalling active flag is set in a TAU request message. And, in the case that the CP CIoT EPS optimization is not used, signalling active flag is not set in a TAU request message. However, these two cases are not distinguished and mo-signalling or delay tolerant access is set to the value of RRC establishment cause. In order to solve such a problem described above, the first method proposes to set a value of the RRC establishment cause field and/or call type as below.

In the case that the CIoT device does not have a PDN connection established for emergency bearer services and is not initiating a PDN CONNECTIVITY REQUEST that has request type set to "emergency" or "handover of emergency bearer services", and the Device properties information element in the TAU request message is set to "MS is configured for NAS signalling low priority", and MO MMTEL voice call/video call is not started, and requests control plane CIoT EPS optimization to transmits user data over control plane (or a TAU request message contains the Additional update type information element is set to the "signalling active"), the RRC establishment cause sets to a new value which is different from the existing value, for example, CP-Delay tolerant, CP-data or delay tolerant for CP data.

At this time, the call type may be set to a new value which is different from the existing value, for example, originating signalling for CP data.

(iii) Control Plane Service Request (CPSR) procedure: The CPSR procedure may be divided into the case of transmitting a CPSR message with user data being included and the case of requesting a signalling resource. In former case, overload control needs to be applied. Accordingly, in the CPSR case, a value of the RRC establishment cause field is set to mo-data or delay tolerant access, the problem occurs in both cases.

In order to solve such a problem described above, the first method proposes to set a value of the RRC establishment cause field and/or call type as below.

In the case that the CPSR procedure is used to transfer user data, the RRC establishment cause is set to MO data or new MO CP-data, or the like.

In the case that the CPSR procedure is used to request resources for UL signalling, the RRC establishment cause is set to MO data or new MO non CP-data, or the like.

In the case that the CPSR procedure is used to transfer user data and contains the Device properties information element with low priority indicator set to "MS is configured for NAS signalling low priority", the RRC establishment cause is set to Delay tolerant or new Delay tolerant for CP-data, or the like.

In the case that the CPSR procedure is used to request resources for UL signalling and contains the Device properties information element with low priority indicator set to "MS is configured for NAS signalling low priority", the RRC establishment cause is set to Delay tolerant or new Delay tolerant for non CP-data, or the like.

In the case that a mode for RAT of a currently accessed eNB corresponds to WB-S1 Mode, and the CPSR procedure is used to transfer MO SMS, the RRC establishment is set to MO data or new MO CP-data.

In the case that a mode for RAT of a currently accessed eNB corresponds to WB-S1 Mode, and the CPSR procedure is used to transfer MO SMS and contains the Device properties information element with low priority indicator set to "MS is configured for NAS signalling low priority", the RRC establishment cause is set to Delay tolerant or new Delay tolerant for CP-data.

In the case that a mode for RAT of a currently accessed eNB corresponds to NB-S1 Mode, and the CPSR procedure is used to transfer MO SMS, the RRC establishment cause is set to MO data or new MO CP-data.

In the case that a mode for RAT of a currently accessed eNB corresponds to NB-S1 Mode, and the CPSR procedure is used to transfer MO SMS and contains the Device properties information element with low priority indicator set to "MS is configured for NAS signalling low priority", the RRC establishment cause is set to Delay tolerant or new Delay tolerant for CP-data.

Additionally, the call type may be set to a new value which is different from the existing value, for example, originating signalling for CP data.

Figure 16A:
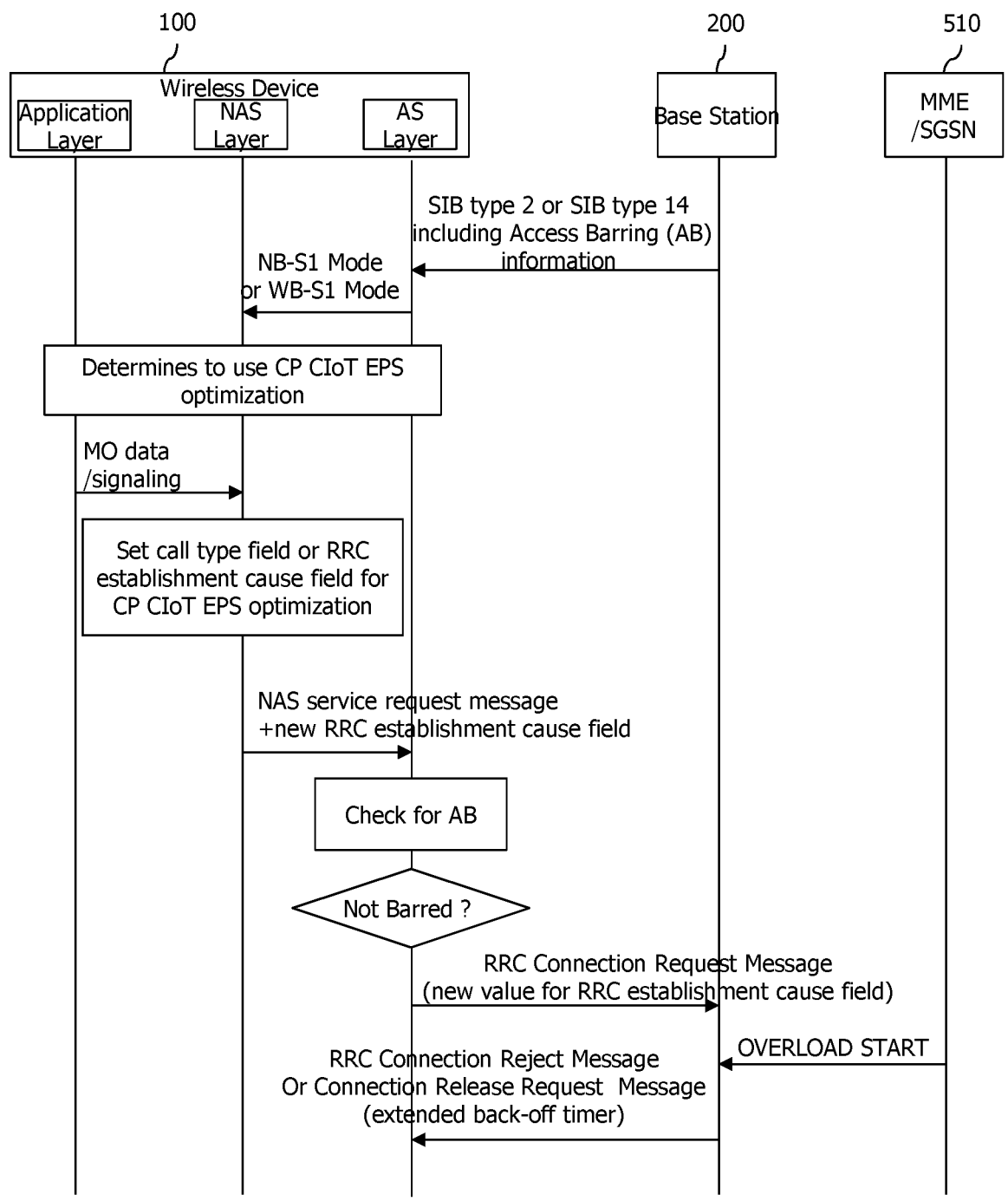
FIG. 16a is a signal flowchart illustrating a procedure according to method 1 of proposal 3 of the present specification.

FIG. 16*a* is a signal flowchart illustrating a procedure according to method 1 of proposal 3 of the present specification.

Referring to FIG. 16*a*, the RRC layer may inform a mode for radio access technology (RAT) of an eNB currently accessed to the NAS layer in advance. For example, in the case that the currently accessed RAT is an improved RAT for NB-IoT, the RRC layer may forward NB-S1 mode to the NAS layer. However, in the case that the currently accessed RAT is a normal RAT, the RRC layer may forward WB-S1 mode to the NAS layer.

The NAS layer of a CIoT device sets the value of the new RRC establishment cause field proposed in method 1 for the CP CIoT EPS optimization and provides it to the RRC layer. Then, the RRC layer sets the value of the RRC establishment cause field in the RRC connection request message (e.g., may be included in the third message of random access procedure), and transmits it to an eNB. At this time, in the case that the eNB received OVERLOAD START message from an MME, the eNB may reject the RRC request message including the new RRC establishment cause (i.e., RRC request message for the CP CIoT EPS optimization). That is, the eNB transmits a reject message to the RRC layer of the CIoT device. The reject message includes a value of extended back-off timer. The reject message may further include information indicating a reject cause. The RRC layer of the CIoT device that receives the reject message forwards the value of extended back-off timer to the NAS layer. The NAS layer of the CIoT device may use the value of extended back-off timer as a value for CP back-off timer (e.g., Txy).

Alternatively, the eNB may not reject the RRC request message including the new RRC establishment cause for the CP CIoT EPS optimization (i.e., RRC request message for the CP CIoT EPS optimization), but may accept the RRC request message for the moment. For the acceptance, the eNB may transmit an RRC connection setup message. At this time, the eNB memorizes/stores the value of new establishment cause field. Later, the eNB transmits an RRC connection release request message to the RRC layer of the CIoT device for the corresponding RRC connection. The connection release request message may include a value of extended back-off timer. The connection release request message may include information indicating a release cause. The RRC layer of the CIoT device may use the value of extended back-off timer as a value for CP back-off timer (e.g., Txy).

Method 1 mentioned above may be applied only to the case that the NAS layer of the CIoT device is provided with NB-S1 mode information or WB-S1 mode information from the RRC layer. Alternatively, method 1 mentioned above may also be applied to the case that the NAS layer of the CIoT device is not provided with NB-S1 mode or WB-S1 mode from the RRC layer (i.e., without regard to whether the NAS layer of the CIoT device is provided with NB-S1 mode or WB-S1 mode from the RRC layer).

III-2. Method 2

In order to solve the second problem described above, according to method 2 of proposal 3, when the NAS layer of a CIoT device forwards an RRC request message for transmitting a NAS signaling request for the CP CIoT EPS optimization to the RRC layer, the NAS layer may forward the RRC request message together with new indication/information. The new indication/information indicates that it is a NAS signaling request for the CP CIoT EPS optimization. As such, in the case that the new indication/information is forwarded, a value of establishment cause field in the RRC request message may be set to mo-data or delay tolerant access as previously.

Figure 16B:
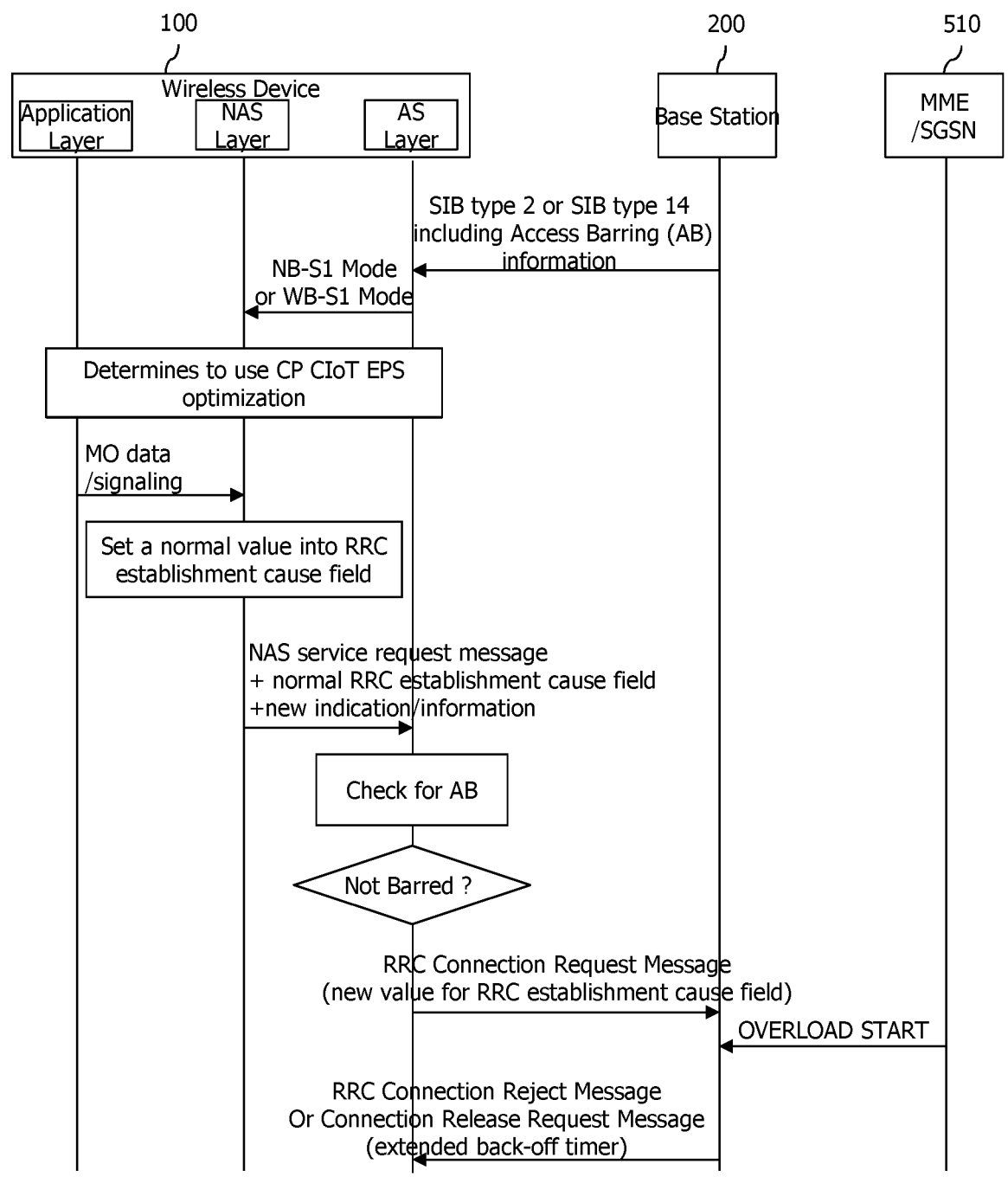
FIG. 16b is a signal flowchart illustrating a procedure according to method 2 of proposal 3 of the present specification.

FIG. 16*b* is a signal flowchart illustrating a procedure according to method 2 of proposal 3 of the present specification.

Referring to FIG. 16*a*, the RRC layer may forward a fact on whether the RAT of a currently accessed eNB is in NB-S1 mode or WB-S1 mode to the NAS layer.

The NAS layer may set a value of establishment cause field in the RRC request message for transmitting the NAS signaling request for the CP CIoT EPS optimization to mo-data or delay tolerant access as previously.

When forwarding the value of establishment cause field to the RRC layer, the NAS layer may forward the value together with new indication/information.

The RRC layer of the CIoT device may include the provided indication/information in the RRC request message, and transmit it to the eNB.

At this time, in the case that the eNB received OVERLOAD START message from an MME, the eNB may reject the RRC request message including the indication/information (i.e., RRC request message for the CP CIoT EPS optimization). The reject message includes a value of extended back-off timer. The reject message may further include information indicating a reject cause. The RRC layer of the CIoT device that receives the reject message forwards the value of extended back-off timer to the NAS layer. The NAS layer of the CIoT device may use the value of extended back-off timer as a value for CP back-off timer (e.g., Txy).

Alternatively, the eNB may not reject the RRC request message including the indication/information (i.e., RRC request message for the CP CIoT EPS optimization), but may accept the RRC request message for the moment. For the acceptance, the eNB may transmit an RRC connection setup message. At this time, the eNB memorizes/stores the indication/information. Later, the eNB transmits an RRC connection release request message to the RRC layer of the CIoT device for the corresponding RRC connection. The connection release request message may include a value of extended back-off timer. The connection release request message may include information indicating a release cause. The RRC layer of the CIoT device may use the value of extended back-off timer as a value for CP back-off timer (e.g., Txy).

Method 2 mentioned above may be applied only to the case that the NAS layer of the CIoT device is provided with NB-S1 mode information or WB-S1 mode information from the RRC layer. Alternatively, method 2 mentioned above may also be applied to the case that the NAS layer of the CIoT device is not provided with NB-S1 mode or WB-S1 mode from the RRC layer (i.e., without regard to whether the NAS layer of the CIoT device is provided with NB-S1 mode or WB-S1 mode from the RRC layer).

III-3. Method 3

Figure 16C:
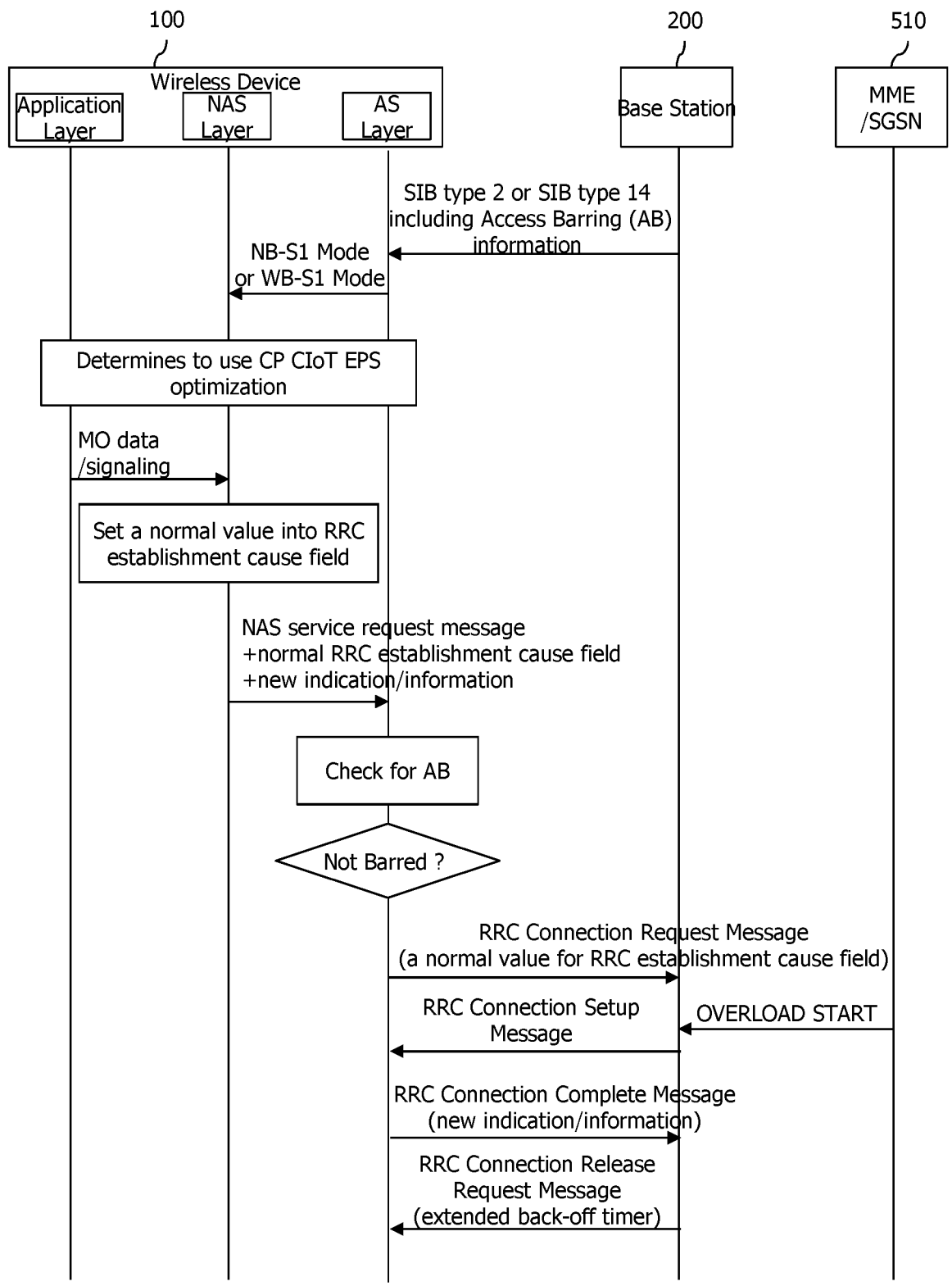
FIG. 16c is a signal flowchart illustrating a procedure according to method 3 of proposal 3 of the present specification.

FIG. 16*c* is a signal flowchart illustrating a procedure according to method 3 of proposal 3 of the present specification.

In order to solve the second problem described above, when the NAS layer of a CIoT device forwards an RRC request message for transmitting a NAS signaling request for the CP CIoT EPS optimization to the RRC layer, the NAS layer may forward the RRC request message together with first indication/information which is newly defined according to method 2. The new indication/information indicates that it is a NAS signaling request for the CP CIoT EPS optimization. Meanwhile, before then, the RRC layer may forward a fact on whether the RAT of a currently accessed eNB is in NB-S1 mode or WB-S1 mode to the NAS layer.

At this time, according to method 3, the RRC layer of the CIoT device may not include the provided indication/information, but transmit the RRC request message including a value of establishment cause field set to mo-data or delay tolerant (i.e., RRC request message for the CP CIoT EPS optimization) to the eNB in the same way as previously.

At this time, even in the case that the eNB received OVERLOAD START message from an MME, the eNB may not reject the RRC request message, but may accept the RRC request message for the moment. For the acceptance, the eNB may transmit an RRC connection setup message. At this time, the eNB memorizes/stores the value of the establishment cause field in the RRC request message.

Later, the RRC layer of the CIoT device transmits an RRC connection setup complete message (the fifth message of random access procedure). At this time, the RRC layer of the CIoT device includes the second indication/information which is newly defined in the RRC connection setup complete message based on the indication/information provided from the NAS layer. The new second indication/information may indicate that only the CP CIoT EPS optimization is supported.

Thereafter, the eNB transmits an RRC connection release request message to the RRC layer of the CIoT device for the corresponding RRC connection. The connection release request message may include a value of extended back-off timer. The connection release request message may include information indicating a release cause. The RRC layer of the CIoT device may use the value of extended back-off timer as a value for CP back-off timer (e.g., Txy).

The new second indication may be represented through the existing field in the RRC connection setup complete message, that is, cp-CIoT-EPS-Optimisation field. Alternatively, the new second indication may be represented through a newly added field in the RRC connection setup complete message.

Method 3 mentioned above may be applied only to the case that the NAS layer of the CIoT device is provided with NB-S1 mode information or WB-S1 mode information from the RRC layer. Alternatively, method 2 mentioned above may also be applied to the case that the NAS layer of the CIoT device is not provided with NB-S1 mode or WB-S1 mode from the RRC layer (i.e., without regard to whether the NAS layer of the CIoT device is provided with NB-S1 mode or WB-S1 mode from the RRC layer).

III-4. Method 4

In order to solve the second problem described above, according to method 4, when the NAS layer of a CIoT device forwards an RRC request message for transmitting a NAS signaling request for the CP CIoT EPS optimization to the RRC layer, the NAS layer sets a value of new RRC establishment cause field and forwards it to the RRC layer, as described in method 1. The RRC layer adds new indication/information in the RRC connection request message (included in the third message of random access procedure) based on the provided value of new RRC establishment cause field, and then, forwards it to an eNB. The new indication/information indicates that it is a NAS signaling request for the CP CIoT EPS optimization.

Alternatively, when the NAS layer of a CIoT device sets the value of the new RRC establishment cause field and provides it to the RRC layer, the RRC layer may include the provided new value of the RRC establishment cause field in the RRC connection request message (e.g., the third message of random access procedure), and transmit it to an eNB.

At this time, in the case that the eNB received OVERLOAD START message from an MME, the eNB may reject the RRC request message including the indication/information or the new RRC establishment cause (i.e., RRC request message for the CP CIoT EPS optimization). The reject message includes a value of extended back-off timer. The reject message may further include information indicating a reject cause. The RRC layer of the CIoT device that receives the reject message forwards the value of extended back-off timer to the NAS layer. The NAS layer of the CIoT device may use the value of extended back-off timer as a value for CP back-off timer (e.g., Txy).

Alternatively, the eNB may not reject the RRC request message including the indication/information or the value of the new RRC establishment cause field (i.e., RRC request message for the CP CIoT EPS optimization), but may accept the RRC request message for the moment. For the acceptance, the eNB may transmit an RRC connection setup message. At this time, the eNB memorizes/stores the indication/information. Later, the eNB transmits an RRC connection release request message to the RRC layer of the CIoT device for the corresponding RRC connection. The connection release request message may include a value of extended back-off timer. The connection release request message may include information indicating a release cause. The RRC layer of the CIoT device forwards the received value of extended back-off timer to the NAS layer. The RRC layer of the CIoT device may use the value of extended back-off timer as a value for CP back-off timer (e.g., Txy).

Alternatively, when the NAS layer of a CIoT device sets the value of the new RRC establishment cause field and provides it to the RRC layer, the RRC layer memorizes/stores the value of the provided new RRC establishment cause field. And then, the RRC layer may not include the value of the new RRC establishment cause field, but transmit the RRC request message including the value of establishment cause field set to mo-data or delay tolerant (i.e., RRC request message for the CP CIoT EPS optimization) to the eNB in the same way as previously.

At this time, even in the case that the eNB received OVERLOAD START message from an MME, the eNB may not reject the RRC request message, but may accept the RRC request message for the moment. For the acceptance, the eNB may transmit an RRC connection setup message. At this time, the eNB memorizes/stores the value of the establishment cause field in the RRC request message.

Later, the RRC layer of the CIoT device transmits an RRC connection setup complete message with being included in the fifth message of random access procedure. At this time, the RRC layer of the CIoT device includes the value of the new RRC establishment cause field provided from the NAS layer in the RRC connection setup complete message. At this time, the RRC layer of the CIoT device may also include the new indication/information in the RRC connection setup complete message based on the value of the new RRC establishment cause field provided from the NAS layer. The new indication/information may indicate that only the CP CIoT EPS optimization is supported.

Thereafter, the eNB transmits an RRC connection release request message to the RRC layer of the CIoT device for the corresponding RRC connection. The connection release request message may include a value of extended back-off timer. The connection release request message may include information indicating a release cause. The RRC layer of the CIoT device may use the value of extended back-off timer as a value for CP back-off timer (e.g., Txy).

The indication/information indicating that the only the CP CIoT EPS optimization is supported may be represented through the existing field in the RRC connection setup complete message, that is, cp-CIoT-EPS-Optimisation field. Alternatively, the new second indication may be represented through a newly added field in the RRC connection setup complete message.

Meanwhile, the RRC layer may forward a fact on whether the RAT of a currently accessed eNB is in NB-S1 mode or WB-S1 mode to the NAS layer. Method 4 mentioned above may be applied only to the case that the NAS layer of the CIoT device is provided with NB-S1 mode information or WB-S1 mode information from the RRC layer. Alternatively, method 4 mentioned above may also be applied to the case that the NAS layer of the CIoT device is not provided with NB-S1 mode or WB-S1 mode from the RRC layer (i.e., without regard to whether the NAS layer of the CIoT device is provided with NB-S1 mode or WB-S1 mode from the RRC layer).

IV. Proposal 4 of the Present Specification to Solve the Second Problem

In order to solve the second problem described above, proposal 4 proposes that the RRC layer of a CIoT device forwards a fact on whether the RAT of an eNB currently accesses is in NB-S1 mode or WB-S1 mode to the NAS layer.

In the case that the NAS layer of the CIoT device is unable to be provided with related information on whether it is NB-S1 mode or WB-S1 mode from the RRC layer, the NAS layer of the CIoT device may set a value for new RRC establishment cause field for the CP CIoT EPS optimization proposed in method 1 of proposal 3 and provide it to the RRC layer, or forward the new indication/information indicating that it is the NAS signaling for the CP CIoT EPS optimization to the RRC layer. Later, the RRC layer of the CIoT device operates according to one of method 1 to method 4 of proposal 3 based on what is provided from the NAS layer.

On the other hand, in the case that the NAS layer of the CIoT device is provided with information on whether it is NB-S1 mode or WB-S1 mode from the RRC layer, the NAS layer of the CIoT device may set a value for new RRC establishment cause field for the CP CIoT EPS optimization proposed in method 1 of proposal 3 and provide it to the RRC layer, or forward the new indication/information indicating that it is the NAS signaling for the CP CIoT EPS optimization proposed in method 2 of proposal 3 to the RRC layer. For example, in the case that the NAS layer is provided with NB-S1 mode information from the RRC layer, the NAS layer may set a value for new RRC establishment cause field for the CP CIoT EPS optimization proposed in method 1 of proposal 3 and provide it to the RRC layer. However, in the case that the NAS layer is provided with WB-S1 mode information from the RRC layer, the NAS layer may forward the new indication/information indicating that it is the NAS signaling for the CP CIoT EPS optimization proposed in method 2 of proposal 3 to the RRC layer. Then, the RRC layer of the CIoT device may operate according to one of method 1 to method 4 of proposal 3 based on what is provided from the NAS layer.

Alternatively, in the case that the NAS layer of the CIoT device is unable to be provided with related information on whether it is NB-S1 mode or WB-S1 mode from the RRC layer, the NAS layer of the CIoT device may set a value for new RRC establishment cause field for the CP CIoT EPS optimization proposed in method 1 of proposal 3 and provide it to the RRC layer, or forward the new indication/information indicating that it is the NAS signaling for the CP CIoT EPS optimization to the RRC layer. However, in the case that the value for new RRC establishment cause field or the new indication/information provided from the NAS layer is not proper to the mode of currently accessed RAT, the RRC layer may disregard what are provided from the NAS layer. In addition, the RRC layer determines a value for RRC establishment cause field or indication/information proper to the mode of currently accessed RAT autonomously. Furthermore, the RRC layer may include the value for RRC establishment cause field or indication/information determined autonomously in the RRC connection request message, and may transmit it to the eNB.

The proposals described above may be used in combination.

The contents described so far may be implemented by hardware. This will be described with reference to the drawing.

Figure 17:
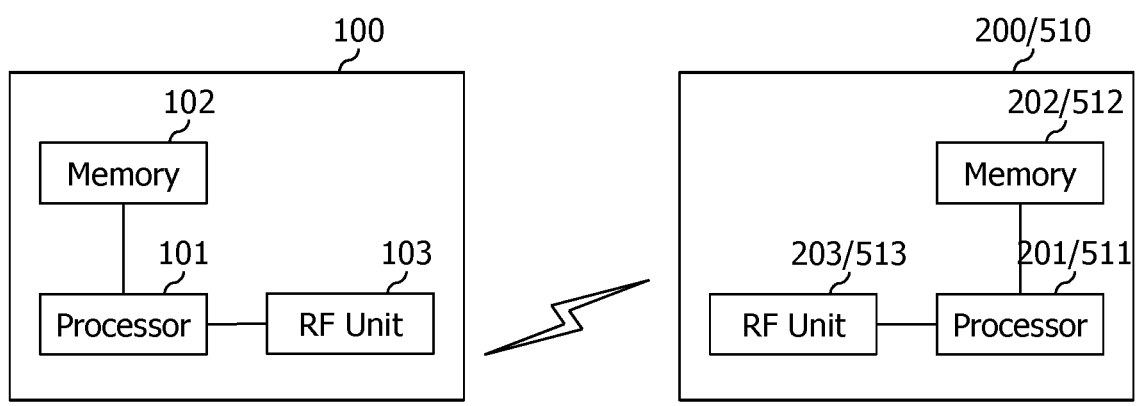
FIG. 17 is a configuration block diagram of a CIoT device 100 and a network device according to an embodiment of the present invention.

FIG. 17 is a configuration block diagram of a CIoT device 100 and a network device according to an embodiment of the present invention.

As shown in FIG. 16, the CIoT device 100 includes a processor 101, a memory 102, and a transceiver unit 103. And the network device may be an eNB 200 or a MME/SGSN 510. This network device 200 or 510 includes a processor 201 or 511, a memory 202 or 512, and a transceiver unit 203 or 513.

The memories 102, 202 or 512 store the above-described method.

The processors 101, 201 and 511 control the memories 102, 202 and 512 and the transceiver units 103, 203 and 513, respectively. Specifically, the processors 101, 201, and 511 execute the methods stored in the memories 102, 202, and 512, respectively. The processors 101, 201, and 511 transmit the above-described signals through the transceiver units 103, 203, or 513.

The present invention has been described with reference to exemplary embodiments, but the scope of the present invention is not limited to such embodiments, and thus the present invention can be modified, changed and improved in various forms within the concept of the present invention and the scope of the claims.

What is claimed is:

1. A method for transmitting a Radio Resource Control (RRC) message performed by a wireless device, the method comprising:

forwarding, by an Access Stratum (AS) layer to a Non-Access Stratum (NAS) layer, first information for a radio access technology (RAT) mode of a base station, wherein the first information includes information as to whether the RAT of the base station is in NB-S1 mode operating as an improved RAT for Narrowband (NB) IoT (Internet of Things) or WB-S1 mode operating as a normal RAT for NB IoT;

obtaining, by the AS layer of the wireless device, an RRC establishment cause field value and second formation, from the NAS layer requesting a transmission of a NAS signaling request message, based on the WB-S1 mode;

transmitting, to the base station, an RRC connection request message including the RRC establishment cause field value and the second information; and based on the second information indicating that the NAS signaling request message includes user data for using a control plane (CP) in an evolved packet service (EPS), receiving an RRC connection reject message or an RRC connection release request message from the base station, wherein the RRC connection reject message or the RRC connection release request message is received from the base station, based on a Mobility Management Entity (MME) being in an overload state.

2. The method of claim 1, wherein based on the AS layer forwarding the information indicating the NB-S1 mode to the NAS layer, only the RRC establishment cause field value is obtained from the NAS layer.

3. The method of claim 2, further comprising:
wherein, based on only the RRC establishment cause field value being obtained from the NAS layer, setting third information in the RRC connection request message based on the value of RRC establishment cause field.

4. The method of claim 2, wherein based on the RRC establishment cause field value being set to a value for using the CP in EPS, the RRC connection reject message or the RRC connection release request message is received from the base station.

5. The method of claim 1, wherein the RRC connection reject message or the RRC connection release request message includes an extended back-off timer value.

6. The method of claim 1, further comprising:
based on an RRC connection setup message being received instead of the RRC connection reject message, by the AS layer, transmitting an RRC connection setup complete message including fourth information indicating that use of the CP in EPS is supported.

7. A wireless device, for transmitting a Radio Resource Control (RRC) message, comprising:
a transceiver;
a processor for controlling the transceiver, including an Access Stratum (AS) layer and a Non-Access Stratum (NAS) layer,
wherein the AS layer forwards first information for a radio access technology (RAT) mode of a base station to a Non-Access Stratum (NAS) layer, wherein the first information includes information as to whether the RAT of the base station is in NB-S1 mode operating as an improved RAT for Narrowband (NB) IoT (Internet of Things) or WB-S1 mode operating as a normal RAT for NB IoT, wherein, based on the WB-S1 mode the AS layer obtains an RRC establishment cause field value and a second information from the NAS layer requesting a transmission of a NAS signaling request message, and wherein the AS layer transmits an RRC connection request message including the RRC establishment cause field value and the second information to the base station, wherein based on the second information indicating that the NAS signaling request message includes user data for using a control plane (CP) in an evolved packet service (EPS), the AS layer receives an RRC connection reject message or an RRC connection release request message from the base station, and wherein the RRC connection reject message or the RRC connection release request message is received from the base station, based on a Mobility Management Entity (MME) being in an overload state.

8. The wireless device of claim 7, wherein based on the AS layer forwarding the information indicating the NB-S1 mode to the NAS layer, only the RRC establishment cause field value is obtained from the NAS layer.

9. The wireless device of claim 8, wherein based on only the RRC establishment cause field value being obtained from the NAS layer, the AS layer sets third information in the RRC connection request message based on the RRC establishment cause field value.

10. The wireless device of claim 8, based on the RRC establishment cause field value being set to a value for using the CP in EPS, the RRC connection reject message or the RRC connection release request message is received from the base station.

11. The wireless device of claim 7, wherein the RRC connection reject message or the RRC connection release request message includes an extended back-off timer value.

* * * * *